United States Patent
Langevin et al.

(10) Patent No.: US 7,301,909 B2
(45) Date of Patent: Nov. 27, 2007

(54) TROUBLE-TICKET GENERATION IN NETWORK MANAGEMENT ENVIRONMENT

(75) Inventors: Eugene J Langevin, Attleboro, MA (US); Daniel O Warren, Stoughton, MA (US)

(73) Assignee: CompuCom Systems, Inc., Dallas, TX (US)

( * ) Notice: Subject to any disclaimer, the term of this patent is extended or adjusted under 35 U.S.C. 154(b) by 1015 days.

(21) Appl. No.: 10/326,317

(22) Filed: Dec. 20, 2002

(65) Prior Publication Data

US 2004/0120250 A1    Jun. 24, 2004

(51) Int. Cl.
*H04L 12/26* (2006.01)
(52) U.S. Cl. ...................................... 370/242
(58) Field of Classification Search ........ 370/241–245, 370/216, 248, 250, 252, 253; 709/223–225; 714/1, 2, 25, 47, 100
See application file for complete search history.

(56) References Cited

U.S. PATENT DOCUMENTS

| 5,295,230 | A | | 3/1994 | Kung |
| 5,383,178 | A | * | 1/1995 | Unverrich ................ 370/245 |
| 5,483,637 | A | * | 1/1996 | Winokur et al. ........... 714/26 |
| 5,539,877 | A | * | 7/1996 | Winokur et al. ........... 714/26 |
| 5,742,762 | A | | 4/1998 | Scholl et al. ........... 395/200.3 |
| 5,959,969 | A | * | 9/1999 | Croslin et al. ........... 370/216 |
| 6,032,184 | A | | 2/2000 | Cogger et al. ........... 709/223 |
| 6,058,420 | A | * | 5/2000 | Davies ................... 709/224 |
| 6,118,936 | A | | 9/2000 | Lauer et al. ........... 395/200.53 |
| 6,263,455 | B1 | * | 7/2001 | Bannister ................ 714/25 |
| 6,393,478 | B1 | * | 5/2002 | Bahlmann ............... 709/224 |
| 6,425,006 | B1 | * | 7/2002 | Chari et al. ............ 709/224 |
| 6,449,588 | B1 | | 9/2002 | Bowman-Amuah |
| 6,473,407 | B1 | * | 10/2002 | Ditmer et al. ........... 370/252 |
| 6,502,131 | B1 | * | 12/2002 | Vaid et al. ............. 709/224 |
| 6,564,341 | B1 | * | 5/2003 | Sundaram et al. ......... 714/43 |
| 2002/0120737 | A1 | | 8/2002 | Martin et al. ........... 709/224 |
| 2002/0161875 | A1 | | 10/2002 | Raymond ............... 709/223 |
| 2002/0194320 | A1 | | 12/2002 | Moyes-Clark |
| 2004/0060073 | A1 | | 3/2004 | Bialk et al. ............. 725/129 |

FOREIGN PATENT DOCUMENTS

GB    2362288 A    11/2001

(Continued)

OTHER PUBLICATIONS

International Search Report, PCT/US 02/41004, 2003, one page.*

(Continued)

*Primary Examiner*—Dmitry Levitan
(74) *Attorney, Agent, or Firm*—Locke Lord Bissell & Liddell LLP

(57) ABSTRACT

The automatic generation and storage of bundled error messages indicative of fault conditions of one or more managed networks is disclosed. The error messages may provide more complete information relating to the managed networks such as information indicative of a detected fault condition as well as information describing the network on which the condition occurred. Fewer duplicative error messages are generated and the number of "false-positive" messages is reduced while still preserving and providing important fault condition information to operators.

36 Claims, 20 Drawing Sheets

FOREIGN PATENT DOCUMENTS

| WO | WO-9750209 A | 12/1997 | |
|---|---|---|---|
| WO | WO-9915950 A | 4/1999 | |
| WO | WO2001/95158 A1 | 12/2001 | ............... 17/30 |

OTHER PUBLICATIONS

Excerpts from CLARIFY FrontOffice 98 API Toolkit Technical Reference, Part No. 701-00011-00B, Feb. 1997, including Title page, Copyright page and Chapters 4-6.

Excerpts from CLARIFY FrontOffice 98 High-Level API (HLAPI) Programmer's Guide, Part No. 701-00010-00D, Sep. 1998, including Title page, Copyright page and Chapters 3-5.

Excerpts from Hewkett Packard, SNMP Developer's Guide, HP OpenView Integration Series Edition 1, Part No. J1150-90009, Jan. 1998, including Title page and Chapter 3.

Excerpts from Hewlett Packard, SNMP Developer's Guide, HP OpenView Integration Series, Part No. J1261-90072, May 2002, including Title page and Chapters 2-3.

Excerpts from Hewlett Packard, Managing Your Network with HP OpenView Network Node Manager, Part No. J1240-90080, May 2002, including Title page and Chapters 1-2.

Communication Relating to the Results of the Partial International Search, pp. 1 and 2, for International Application No. PCT/US02/41004; and Patent Family Annex for International Application No. PCT/US02/41004; Sep. 12, 2003.

PCT International Search Report (10 Pages), Application No. PCT/US02/41004, Dated Dec. 30, 2003.

\* cited by examiner

CLIENT REQUESTS

| REQUEST LENGTH | INDICATES THE LENGTH OF THE CLIENT REQUEST |
|---|---|
| REQUEST ID | IDENTIFIES THE CLIENT REQUEST |
| TRAP ARRIVAL TIME | INDICATES THE TIME CLIENT RECEIVED THE TRAP DATA FROM CUSTOMER NETWORK. |
| CLIENT IP ADDRESS | PROVIDES IP ADDRESS OF THE CLIENT |
| HOST IP ADDRESS | PROVIDES IP ADDRESS OF THE DEVICE OR NODE REPORTING FAULT CONDITION |
| PORT NUMBER | IDENTIFIES PORT WITH FAULT CONDITION |
| STATION NUMBER | IDENTIFIES STATION WITH FAULT CONDITION |
| ENTERPRISE | IDENTIFIES MANUFACTURER OF THE ITEM WITH FAULT CONDITION |
| SPECIFIC | IDENTIFIES A LOW-LEVEL TRAP DEFINITION |
| MESSAGE | DESCRIBES FAULT THAT OCCURRED |

FIGURE 8a

SERVER RESPONSES

| RESPONSE LENGTH | INDICATES THE LENGTH OF SERVER RESPONSE |
|---|---|
| RESPONSE ID | IDENTIFIES THE CLIENT REQUEST TO WHICH THIS RESPONDS |
| REQUEST STATUS | INDICATES WHETHER OR NOT AN APPROPRIATE TROUBLE-TICKET WAS SUCCESSFULLY CREATED OR UPDATED (ACK OR NAK) |
| MESSAGE | DESCRIBES FAULT CONDITION AS ADDRESSED IN TROUBLE-TICKET CREATED/UPDATED |

FIGURE 8b

| [READ] Case 00003034524 | | |
|---|---|---|
| Customer: | Telco.com (LinkSys) | Primary Site: A1818117_3587 .... Alarm: 11/21/02 15:49:48 D/T |
| Line Name | TC 78802_3567_P8852 | Site ID: 188123376 Report: 11/21/02 15:50:01 D/T |
| CktID: | ARE0887954 ATI | Opened By: online ▶ Referred: 11/21/02 15:50:16 D/T |
| Nd Name: | | Reason: ▶ Repair: 11/21/02 16:21:57 D/T |
| Owner/Impact: | LinkSys-Normal ▶ | Owner: LineVendor ▶ Prefix: 884 Send Case Text |
| Status: | Troubleshooting | Owners Ph: Speed Dial: 287 |
| Problem: | FRI-8852s58 - LINK DOWN | Owner's Ticket: 2N2105127 |

| Connections | Site Info | DeviceInfo | Line Info | History | Prev. Cases | Spec. Consid. | | No Open Subcases |
|---|---|---|---|---|---|---|---|---|
| | 290 | | 292 | | 294 | | Devices | Dispatch Activity |
| Device Name: | A1818117_3587 | | Wan IP: | 10.7.254.88 | | | | Activity Log |
| Dev. Addr.: | 17812158 | | LAN IP: | 10.7.88.1 | | | | Flashes |
| Model No: | VG320 | | Internal IP: | 10.7.254.88 | | | | Solve |
| S/N: | 141428884 | | DBU#: | | | | | Search |
| Install Date: | 03/28/02 00:00:00 | | Bkup Port: | | | | | Select Soln |
| DLCI: | 156 | | Bkup Circuit: | | | | | Save |
| Host LCON: | 0 | | NAT IP Addr: | 16.7.254.88 | | | | Close Case |
| Local Loop ID: | | | LEC Phone: | | | | | |
| LEC Name: | | | | | | | | Done |

Case 00003034524

No Open Exchanges

Ready 16:37

Figure 13 c

[READ] Case 0000303452

Customer: Telco.com (LinkSys)　Primary Site: A1818117_3587 .... Alarm: 11/21/02 15:49:48 D/T
Line Name: TC 78802_3567_P8852　Site ID: 188123376　Report: 11/21/02 15:50:01 D/T
CktID: ARE0887954 ATI　Opened By: online ▶　Referred: 11/21/02 15:50:16 D/T
Nd Name:　Reason: ▶　Repair: 11/21/02 16:21:57 D/T
Owner/Impact:　Owner: LineVendor ▶　Prefix: 884
Status: LinkSys-Normal ▶　Owners Ph:　Speed Dial: 287　Send Case Text
Problem: Troubleshooting　　　Owner's Ticket: 2N2105127
FRI-8852s58 - LINK DOWN

| Connections | Site Info | Device Info | Line Info | History | Prev. Cases | Spec. Consid. |

No Open Subcases
Dispatch Activity
Activity Log

Priority: Medium ▶　　312　　Create Date: 11/21/02 15:49:58　　Flashes
Queue:　　　　　　　　　　　WIPbin: default　　　314　　Solve
Owner: Perry_Jarrod　　　316　　Condition: Open　　　Search
History:　　　　　　　　　　Case Type: Trouble Ticket ▶　Select Soln
　　　　　　　　　　　　　　　　　　　　　　　　　　　　Save
FRI-8052s88 - LINK DOWN 11/21/02 15:49:58　　　　　　　Close Case
*** PHONE LOG 21-Nov-2002 15:54:18 Eastern Daylight Time Perry_Jarrod Type: Outgoing call
opened LinkSys ticket 2N8185187.....emailed TC
*** NOTES 21-Nov-2002 16:21:57 Eastern Daylight Time Server_ATGA
FRI-8052s88 - LINK UP EMEA Case #:　　　　　　No Attachments　　Back　　More　　Done Ready　　　　　　　　　　　Case 0000303452　　　　　　No Open Exchanges　16:37

Figure 13e

Cases from Query : Untitled45

| Case ID | Customer | Impact | Site | Node Na | Status | Owner Ti | Last Modified |
|---|---|---|---|---|---|---|---|
| 0000278777 | Telco.com | Telco - Impaired | A1828898_8587 | TC78802 | Troublesh | 2814826 | 11/20/02 18:11:27 |
| 0000294808 | Telco.com | Telco - Impaired | A1874978_8507 | TC78801 | Troublesh | 2884813 | 11/21/02 12:25:23 |
| 0000800241 | Telco.com | Telco - Impaired | A1886178_8587 | TC78801 | Monitoring | 2N18844 | 11/21/02 13:46:53 |
| 0000808111 | Telco.com | Telco - Impaired | A5887174_8587 | host_921 | Closed | 2N81887 | 11/21/02 09:20:09 |
| 0000808886 | Telco.com | Telco - Impaired | Host_8887 | TC78801 | Awaiting R | | 11/21/02 14:56:45 |
| 0000808452 | Telco.com | Telco - Impaired | A1818117_8587 | | Troublesh | 2N81851 | 11/21/02 16:21:57 |

320

252' 254' 260' 264' 259' 261' 270' 311

Title

[Print List] [Open] [Prompt] [Query] [Done]

6  Items                Case 0000303452  252        16:37

Ready

Figure 14a

Cases from Query : Untitled45 — 320

| Title | Owner | Condition | Priority | Contact Fir | Contact Last N | IPAddress | Unit | Circuit ID |
|---|---|---|---|---|---|---|---|---|
| Chronic-Send new VG320 | Perry_Jarr | Open | 5X10X4 | John | Cobb | GP73302_3 | L | ARE084488 |
| Chronic-Site bouncing again | Perry_Jarr | Open | Medium | Mark | Ti | GP73301_3 | L | ARE076788 |
| Link down p3051s89:A1036 Node Down | Perry_Jarr | Open | Medium | Claudia | Clark | GP73301_3 | L | ARE094488 |
| Site Down: A1033033 | Perry_Jarr | Closed | Medium | Branch Jeff | Manager Jones | Host_921_3 GP73301_3 | L L | ARE058088 DHE877588 |
| FRI-3052s56 - Link Down | Perry_Jar | Open | Mediu | John | Cobb | GP73302_3 | L | ARE060788 |

262' 268' 312 313 280' 280" 256' 314 258'

[ Print List ]   [ Open ]   [ Prompt ]   [ Query ]   [ Done ]

Title

6  Items    Case 0000303452

Ready    16:37

Figure 14b

TROUBLE-TICKET GENERATION IN NETWORK MANAGEMENT ENVIRONMENT

BACKGROUND OF THE INVENTION

1. Field of the Invention

The present invention is directed to systems, methods, apparatus and related software for managing computer networks. More particularly, the invention relates to the generation of trouble-tickets (bundled error messages) indicative of fault conditions of one or more managed networks. Accordingly, the general objects of the invention are to provide novel systems, methods, apparatus and software of such character.

2. Description of the Related Art

With the ascendancy of the modern computer in the last few decades have come new ways to harness its potential. For example, as smaller computers became more powerful, they could be linked together as a network, in order to share memory space, software, information and to more easily communicate with each other. As opposed to a mainframe computer, distributed computer networks allow individual computers to form "electronic co-ops" structured in a hierarchical fashion. Whether using direct wiring (e.g., such as a Local Area Network (LAN)) or indirect communicative coupling (such as telephone lines, T1, T2 or T3 lines, etc.), contemporary networks can reach extraordinary proportions in terms of geographic scope, technical complexity, management costs, and processing capabilities. Since such networks may yield tremendous computing power that is dispersed over a wide geographical area, recent decades have seen a concomitant reliance placed on such computer networks.

The enormous benefits obtained from the use of such computer networks are, however, tempered by the fact that computer hardware, firmware and software do malfunction in many ways for a wide variety of reasons. In fact, the more complicated the computer system, the more likely that problems will occur and the more difficult it is to diagnose and solve each problem. Accordingly, techniques, hardware, software, etc. have been developed for the sole purpose of managing computer networks so that network outages will be minimized. This task is currently, however, a labor intensive, costly, stressful, and complicated task.

One widely used and helpful system for detecting fault conditions existing on computer networks is a network management software package manufactured by Hewlett-Packard and entitled "OpenView." This software includes a graphical user interface (GUI) that is capable of graphically displaying the architecture of managed networks as well as displaying limited information regarding the status of various components of each network. The displayed network components are identified through a network discovery process during a set-up phase and the various components of the network are color-coded to thereby indicate the status of the various components. OpenView also includes a browser for displaying textual information regarding the status of the various components of the network. With such a system, each network management operator may monitor several networks simultaneously in an effort to detect and solve fault conditions from a remote network operations center (NOC).

Upon detection of a fault condition of a network, OpenView is capable of presenting fault related information to an operator. Such information may include network IP addresses for the various components of the monitored network where the fault was detected. However, OpenView is not capable of providing the operator with contact information (name, telephone number address, etc.) for the personnel resident at the managed network. Nor can it convey any special procedures that should/must be followed to fulfill the trouble-shooting preference and/or requirements of various customers. This deficiency forces network management operators to manually look up such information recorded in a conventional paper format, such information being necessary to obtain prior to taking action to solve a reported fault condition.

The converse deficiency of OpenView is that it may overwhelm a network management operator by flooding the operator with duplicative, repetitive, irrelevant and/or unnecessary information. Of particular concern is the possibility that critical network management information will go unnoticed to amid a mass of other data. This may occur, for example, where a single point-source network outage affects a large number of monitored network devices connected to a faulty component. When this occurs, each one of the monitored network devices may report the same problem to a network management operator by issuing a fault message (called a "trap" in SNMP terminology) describing a related problem occurring at a different location. In large networks, this may yield hundreds of essentially duplicative error messages being reported to a network management operator even though, as a practical matter, only a single problem exists and needs to be solved.

A related problem is that of "network bouncing." Network bouncing refers to network fault conditions that only temporarily exist and then resolve themselves. Poor quality lines, overloaded lines, solar flares, maintenance operations of a third-party line provider, non-destructive power surges resulting from thunder storms, etc., may all cause such network bouncing. Other examples are widely known in the art.

Considering lightning strikes as an illustrative example, a temporary and localized power surge resulting from a lightning strike may briefly interfere with normal operations of the computer network. Provided the power surge is nondestructive, however, the fault condition will cease to exist in a short time without any intervention whatsoever. In this situation, the monitored network device will issue fault data indicating an outage while the power surge exists and, in a short time, issue another message indicating that the outage has resolved itself. Thus, a single monitored network device may issue two messages within moments of each other even though the initial fault condition may have resolved itself before a network management operator has time to take any corrective action whatsoever. This is somewhat akin to receiving a false-positive test result during a medical diagnosis. Where hundreds of devices are influenced by a single lightning strike and dozens of lightning strikes occur in a single hour, thousands of essentially useless messages can be delivered to a network management operator. Amid this mass of data, more important error messages indicative of more serious fault conditions can easily go unnoticed by network management operator.

When a database is used in combination with a network monitoring tool in the NOC, conventional network monitoring systems require operators to access the database, open a record and manually enter content for each new fault condition being addressed. One popular database for use in such a system, is CLARIFY produced by Amdocs, Inc. which is headquartered in Chesterfield, Mo., USA. Data entry of this type is a time consuming process that can lengthen the time necessary for the network management operator to take corrective action to thereby solve reported fault conditions. Automatic generation and storage of comprehensive trouble-tickets into one or more databases would, accordingly, greatly improve the ability of operators to properly diagnose and correct network fault conditions.

There is, accordingly, a need in the art for novel methods, systems and apparatus for automatically generating bundled error messages that provide network management operators with more complete information relating to managed customer networks to thereby permit more efficient network management. Such methods and apparatus should provide operators with information indicative of the fault detected as well as network-specific profile information describing the network devices on which the detected fault condition occurred.

There is an additional need in the art for novel methods, systems and apparatus for automatically generating bundled error messages that provide network management operators with fewer duplicative error messages while not permitting important fault condition information to be lost.

There is another need in the art for novel methods, systems and apparatus for automatically generating bundled error messages that automatically reduce the number of "false-positive" error messages provided to network management operators.

There is another need in the art for novel methods, systems and apparatus for automatically generating bundled error messages in which the sensitivity to "false-positive" error messages may be adjusted.

SUMMARY OF THE INVENTION

The present invention satisfies the above-stated needs and overcomes the above-stated and other deficiencies of the related art by providing methods, systems and apparatus delivering a bundled error message to a network-management operator wherein the bundled error message preferably includes both network fault data relating to a fault condition of a network and network-specific profile data corresponding to the network originating the fault condition. In accordance with the invention the method includes receiving fault data identifying the network with the fault condition and, in response thereto, retrieving network-specific profile data for the network with the fault condition. The inventive method then automatically generates a trouble-ticket, including at least some of the fault and the profile data, so that the operator may retrieve the trouble-ticket for display.

Preferred forms of the invention may include a wide variety of desirable features including the ability to set a fault condition impairment level of the trouble-ticket, the impairment level being indicative of the severity of the fault condition. The invention also envisions automatic transmission of acknowledgements to the operator indicating that the fault condition has been detected, wherein the acknowledgment contains at least some of the profile data and at least some of the received fault data.

One particularly desirable feature of a preferred form of the invention is the ability to reduce duplicative error message that may result from a number of circumstances such as network bouncing. The invention achieves this aim by waiting for receipt of subsequent related fault data from the faulty network before retrieving network-specific profile data and terminating the process if related fault data indicating that the fault condition has ceased is received before a predetermined time has elapsed. That predetermined time may be selectable to thereby adjust the sensitivity to the occurrence of false-positive messages.

Another particularly desirable feature of a preferred form of the invention is the ability to aggregate substantially identical fault data indicating that the same fault condition exists at plural locations of a faulty network. The invention achieves this aim by waiting a predetermined time for receipt of related fault data from the faulty network before retrieving the network-specific profile data and compressing all substantially identical fault data into a single request to generate a single comprehensive trouble-ticket.

In a related form, the invention is directed to a computer readable medium containing a computer program for delivering a bundled error message to a network-management operator, the bundled error message comprising network fault data relating to a fault condition of a customer network and network-specific profile data corresponding to various and attributes of the network with the fault condition. The computer program preferably includes a module for receiving fault data that identifies the network with the fault condition, a module for retrieving profile data for the network with the fault condition, a module for generating a trouble-ticket with fault and profile data in response to receipt of the fault data, and a module for displaying the bundled error message to the operator in response to a request to display the bundled error message.

Naturally, the above-described methods of the invention are particularly well adapted for use with the above-described apparatus of the invention. Similarly, the apparatus of the invention are well suited to perform the inventive methods described above. The present invention may be implemented with software, firmware, harware or any combination thereof.

Numerous other advantages and features of the present invention will become apparent to those of ordinary skill in the art from the following detailed description of the preferred embodiments, from the claims and from the accompanying drawings.

BRIEF DESCRIPTION OF THE DRAWINGS

The preferred embodiments of the present invention will be described below with reference to the accompanying drawings wherein like numerals represent like steps and/or structures and wherein:

FIGS. 8a and 8b generally illustrate the of type data exchanged between the Auto-Ticket Generator Client and Server during Request/Response messaging;

FIGS. 14a and 14b depict respective first and second halves of another ATG Database GUI in accordance with a preferred embodiment of the present invention.

DETAILED DESCRIPTION OF THE PREFERRED EMBODIMENTS

Figure 1:
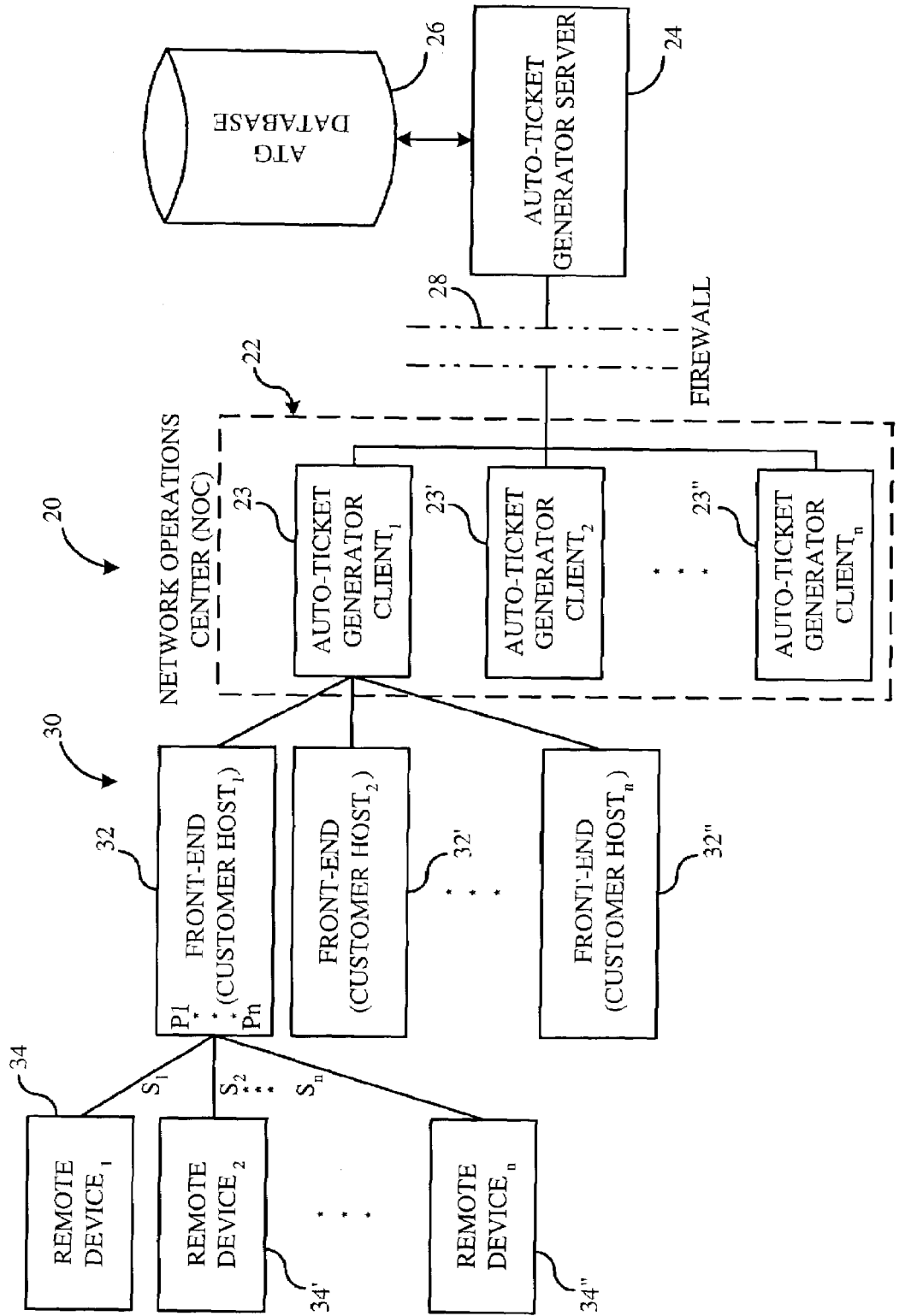
FIG. 1 is a high-level block diagram showing a hardware embodiment of the invention in combination with a conventional customer network represented canonical form.

FIG. 1 is a high-level block diagram 20 showing a hardware embodiment of the inventive auto-ticket generator ("ATG") in combination with plural conventional customer networks 30 represented in canonical form. As shown therein, this embodiment of the present invention preferably includes a network operations center 22 having plural auto-ticket generator clients 23, 23', and 23" that are communicatively linked to an auto-ticket generator server 24 with a firewall 28 therebetween. Server 24 is, in turn, communicatively linked to an auto-ticket generator database 26. Typically, each client will be controlled by a respective operator that also controls a network monitoring tool (23a of FIG. 2) and a database GUI (not shown) that is communicatively linked to the ATG database 26. Each ATG client 23 is communicatively linked to one or more customer networks through a network front-end 32, 32' and 32". Each of the customer networks may have plural ports P1-Pn and each port may have a plurality of stations S1-Sn at which respective remote devices 34, 34' and 34" are connected. In the simplified example of FIG. 1, network monitoring apparatus may be placed at each customer front-end 32, 32' and 32". In this way, for example, a change in condition occurring at one of the remote devices 34, 34' or 34" may be reported to the NOC with the host front-end issuing a trap that indicates (1) the type of change that has occurred; and (2) the location (uniquely identified by the host IP address, the port number and the station number) experiencing the change.

As an illustrative example, one representative customer network may be configured for use by a petroleum company that operates many retail gasoline-dispensing stations throughout a geographically diverse area such as the entirety of the United States. The hypothetical customer may have a single computer system (e.g., the "front-end") located at a national headquarters and a plurality of geographically remote "sites" each of which includes a computer or a computer network controlling operations for one of the 50 states. The remote computers may be communicatively linked to the front-end computer with a dedicated line, such as a T1 line, connected to one of the 50 ports at the front-end. Each of the ports may further, include plural stations each of which is dedicated to a particular gasoline-dispensing station within one of the states. Those of ordinary skill in the art will readily appreciate that this hierarchical arrangement may be easily extended to many different levels until each computer controlled pump of each retail outlet is specified. Depending on the customer's needs, any one or more of these devices at any level of the customer network may be configured for monitoring with the present invention as discussed below.

Each customer network typically includes many components and each component to be monitored is communicatively linked to an associated conventional monitoring device which is capable sending messages indicative of the status of the device being monitored (e.g., functioning normally, impaired, crashed, etc., . . . ). In a preferred embodiment, the monitoring device may be any one or more of the 3XX, 6XX, 64XX and/or 73XX series routers manufactured by Vanguard Managed Solutions of Mansfield, Mass., USA. Those of ordinary skill in the art will know of routers manufactured by other companies that are compatible with the present invention. One such group of routers are manufactured by Cisco Systems of San Jose, Calif., USA. These monitoring products are all preferably capable of messaging with client computers of a Network Operations Center "NOC" in accordance with a Simple Network Management Protocol "SNMP." For example, the monitoring devices will preferably be capable of sending SNMP "traps" that include the following data types: Host IP address, Port Number, Station Number, Fault Type. These traps may first undergo preliminary processing, such as filtering, within a network management tool such as "OpenView" manufactured by Hewlett-Packard. Regardless, the traps that survive OpenView filtering will be sent to an ATG Client for additional processing as discussed in detail below.

Figure 2:
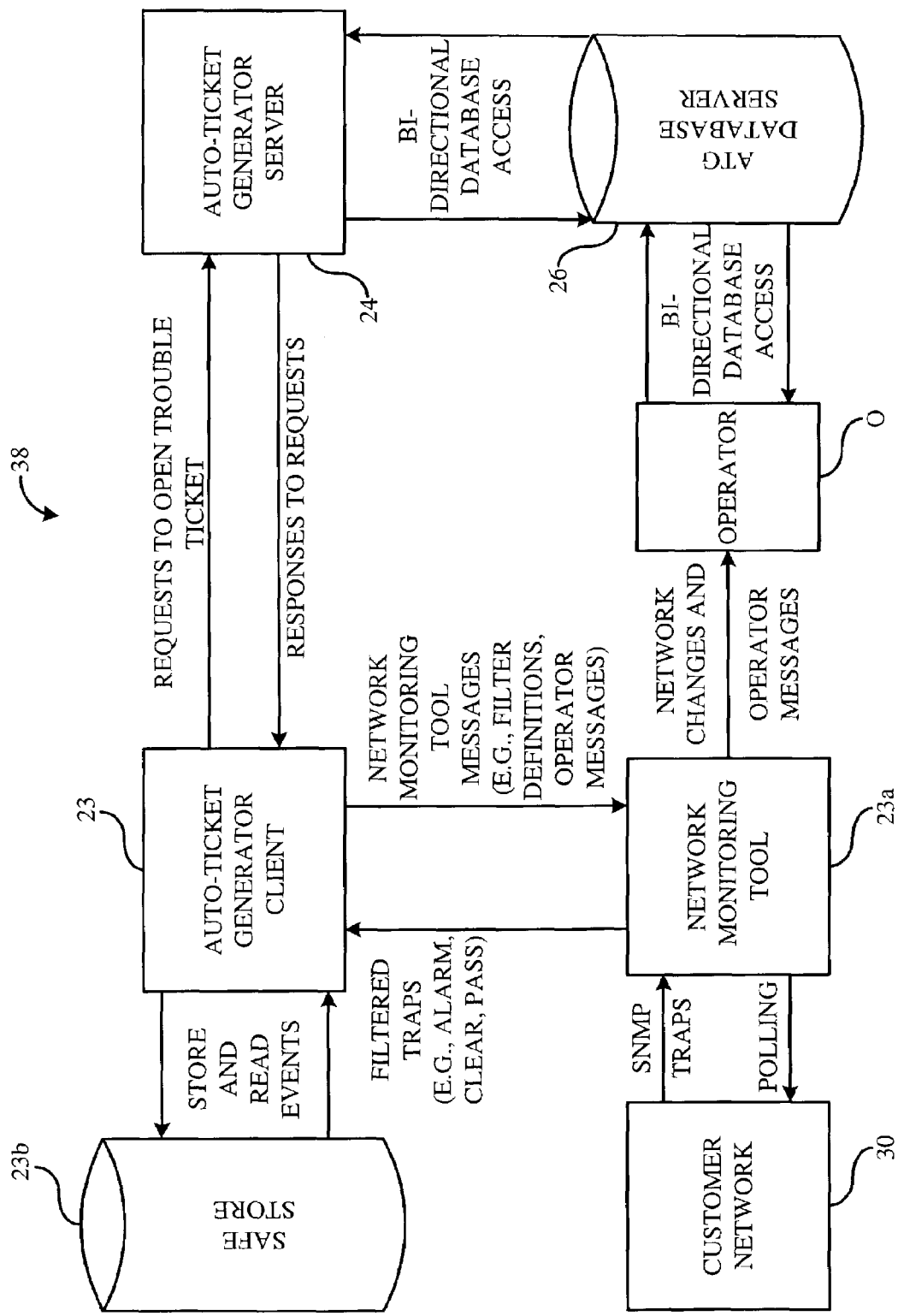
FIG. 2 illustrates message flow with the trouble-ticket generation methods and apparatus, etc. in accordance with one preferred embodiment of the present invention wherein a simple case of a single client, server and customer network is shown for purposes of illustration.

With reference now to FIG. 2, there is shown therein a high-level block diagram 38 illustrating message flow within the auto-ticket generation system in accordance with one preferred embodiment of the present invention. As shown, each customer network 30 is capable of being polled by a network monitoring tool 23a (preferably Hewlett-Packard "OpenView"), but is also capable of generating SNMP messages indicative of the status of the various components of the customer network on its own. As known, these traps may be filtered by a trap daemon of the network monitoring tool to thereby only pass traps of a certain nature to auto-ticket generator client 23. The network monitoring tool will also attempt to signal an operator O when a trap has been received by manipulating the operator's GUI. However, due to traffic on the system, it may take several minutes for such a signal to appear on the operator's GUI.

In the meantime, fault messages that have been passed to client 23 and, if the trap passes a secondary filter at client 23, may be held within the ATG Client for a selectable predetermined time before further processing as described in greater detail below. Client 23 will then store certain trap information in a "safe store" binary file 23b to thereby preserve the data in the event of a problem that prematurely terminates the process (such as a system crash) and will send to the ATG Server 24 a request to automatically generate a trouble-ticket. The ATG Server will then attempt to open a trouble-ticket and send to ATG Client 23 a response indicative of whether or not a trouble-ticket has been opened and, if so, providing identification information for that trouble-ticket. If the ATG Server cannot find data in the database corresponding to the network location where the trap originated, the ATG Server generates a response to that effect and sends it to ATG Client 23. This response may indicate that a "partial" or "generic" trouble-ticket has been generated. Alternatively, it may indicate that a complete failure has occurred.

If, however, the ATG Server determines that the ATG Database is pre-populated with connection information corresponding to the customer network location from which the trap originated, ATG server 24 will attempt to determine if a trouble-ticket has already been opened for this particular device. If so, server 24 will append the additional information into the previously existing trouble-ticket. At that point, an operator O may refresh the database GUI for run an appropriate query to see that a prior trouble-ticket was updated. If there is no prior trouble-ticket for this fault, server 24 will open a new ticket in the ATG Database and inform client 23 that a new trouble-ticket has been generated by sending a response (having at least a ticket ID) to the client. The client then passes that information to operator O so that the operator may access the ticket either querying the ATG Database using the ticket ID or by refreshing the database GUI.

In sum, the server incorporates information provided by the customer network and information previously stored in the ATG Database into a bundled error message stored in the ATG Database by querying the database based on information provided to it by client 23. If there is no previous trouble-ticket, server 24 will generate one and commit the bundled error message to the database 26 so that operator O may subsequently retrieve the bundled error message from the ATG Database and take corrective action.

Each of the Auto-Ticket Generator Clients preferably runs on a conventional workstation and may operate with one of many conventional operating systems such as Hewlett-Packard Unix ("HP-UX"), Sun Solaris or Windows NT. Each workstation also preferably runs a network-monitoring tool (such as Hewlett-Packard OpenView) that may receive SNMP messages from plural customer networks.

Auto-ticket generator server 24 preferably runs on a conventional personal computer and may operate with one of many conventional operating system such as Windows NT. While one ATG server is depicted in each of FIGS. 1 and 2, it should be understood that plural servers may be utilized to, for example, improve backup capabilities as well as to share processing tasks as desired.

ATG Database 26 is preferably a Clarify database that preferably runs on a conventional relational database server. A corresponding conventional database client is preferably resident on the ATG Server and includes the database Application Protocol Interfaces "API" appropriate for efficient communication with the ATG Database. Similarly, network-monitoring operator O may access ATG Database 26 with a database management/query package such as Clarify ClearSupport. The database is preferably populated with detailed information that corresponds to each of the customer networks being monitored as well as information about each customer itself. For example, the ATG Database is preferably pre-populated with site information, line information, device information including but not limited to IP addresses, contact information such as customer street addresses and customer personnel phone numbers, customer preferences and special fault-handling preferences/procedures.

Figure 3:
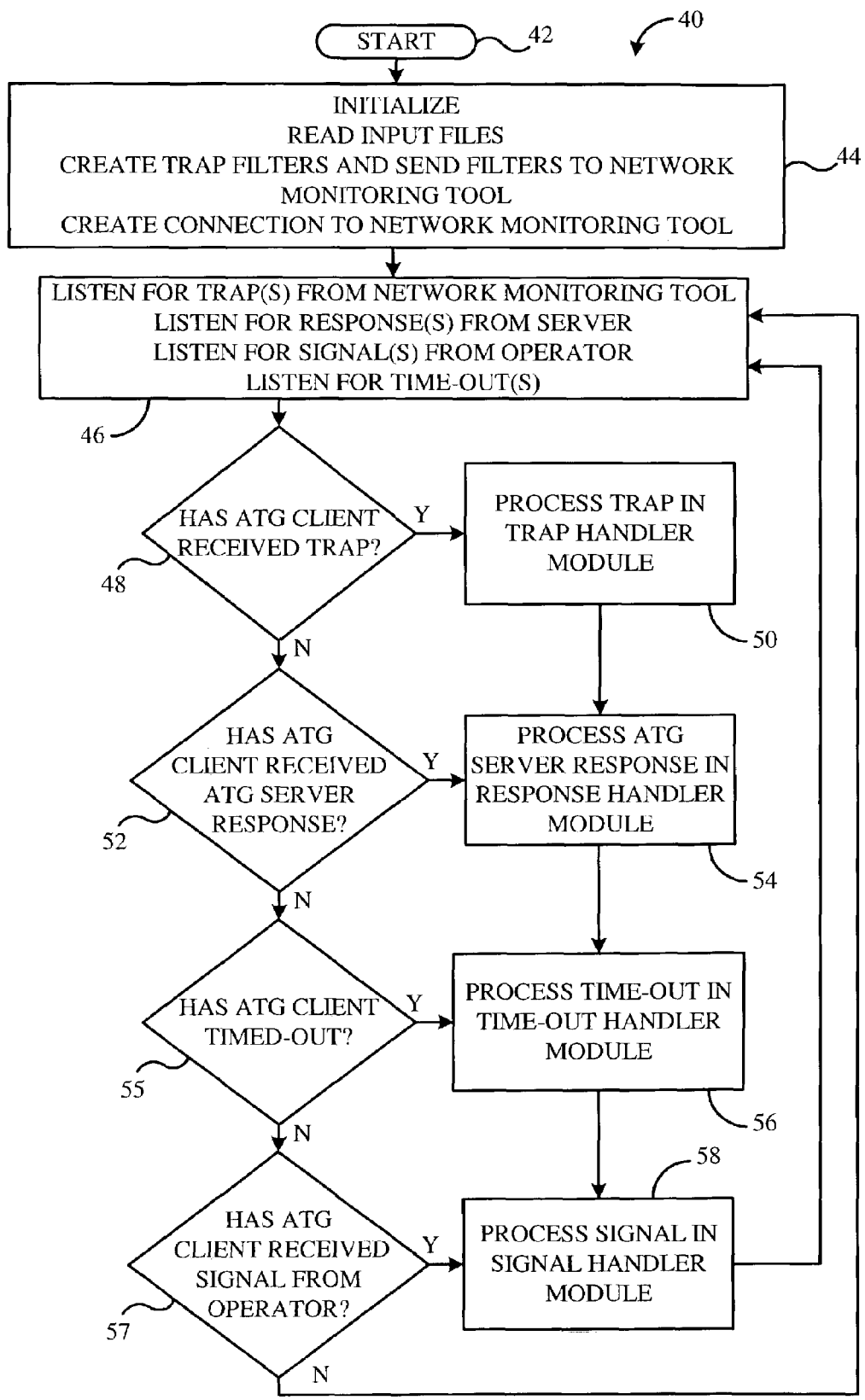
FIG. 3 is a high-level block diagram illustrating Auto-Ticket Generator Client functionality in accordance with one preferred embodiment of the present invention.

Turning now to FIG. 3, there is shown therein a high-level block diagram 40 illustrating operation of the ATG Client 23. As shown therein, client process 40 begins at block 42 and passes to block 44 where client 23 is initialized. This preferably includes reading input files, creating trap filters and creating a connection to the network monitoring tool using those trap filters. These filters determine which types of traps (i.e., SNMP messages indicative of a change in network status such as a newly arising fault condition) are passed through the network monitoring tool to the ATG Client for further processing. In one preferred embodiment, the filters only allow traps to pass the network monitoring tool which the inventive system classifies as being one of three types. They are "alarms," "clears," and "passes."

ATG Client process 40 then proceeds to block 46 where the client enters an active listening state in anticipation of receiving one or more of the number of items. For example, the client may wait for traps from the network monitoring tool. Additionally, the client may wait for responses to previously issued requests from the server. The client also waits for a state signals from the operator. Finally, the client may wait for an internally generated timeout signal.

When the client has received one or more of the above-identified items, client process 40 loops through a series of decision blocks 48-57 of FIG. 3 in an effort to determine how to handle the item received. Those of ordinary skill will readily appreciate that, upon startup, the only two possibilities are receipt of an SNMP trap or receipt of a signals from the operator. This is because, at this point, no prior requests have been sent to the server (and, therefore, no responses could be forthcoming) and no timeouts have been set (hence, none could occur). Taking the case where the client has received a trap from the network monitoring tool, the process passes through block 48 to block 50 where the received trap is processed in a trap handler module (see sub-process 60 of FIG. 4). Client process 40 then passes to block 54 where server responses, if any, are processed in a response handler module (see sub-process 80 of FIG. 5). Client process 40 then passes to block 56 where timeouts, if any, are processed in a timeout handler module (see sub-process 90 of FIG. 6). Client process 40 then passes to block 58 where operator state-change signals, if any, are processed in a signal handler module (see sub-process 100 of FIG. 7). Client process 40 then returns to block 46 where ATG Client 23 again waits for receipt of a new item.

If a server response is received at client 23, client process 40 passes from block 46, through block 48, through block 52 and into block 54. At block 54, the response is processed and client process 40 returns to block 46 via blocks 56 and 58 as discussed above.

If a time-out signal is received at client 23, client process 40 passes from block 46, through blocks 48, 52 and 55 and into block 56. At block 56, the signal is processed and client process 40 returns to block 46 via block 58 as discussed above.

If a state-change signal is received from an operator at client 23, client process 40 passes from block 46, through blocks 48, 52, 55 and 57 and into block 58. At block 58, the state-change signal is processed and sub-process 40 returns to block 46 as discussed above. Finally, if client process 40 fails the tests of all of blocks 48, 52, 55 and 57 and returns directly to block 46. This feature provides a failsafe mechanism for returning to block 46 in the unlikely event that some unforeseen circumstance arises.

Figure 4:
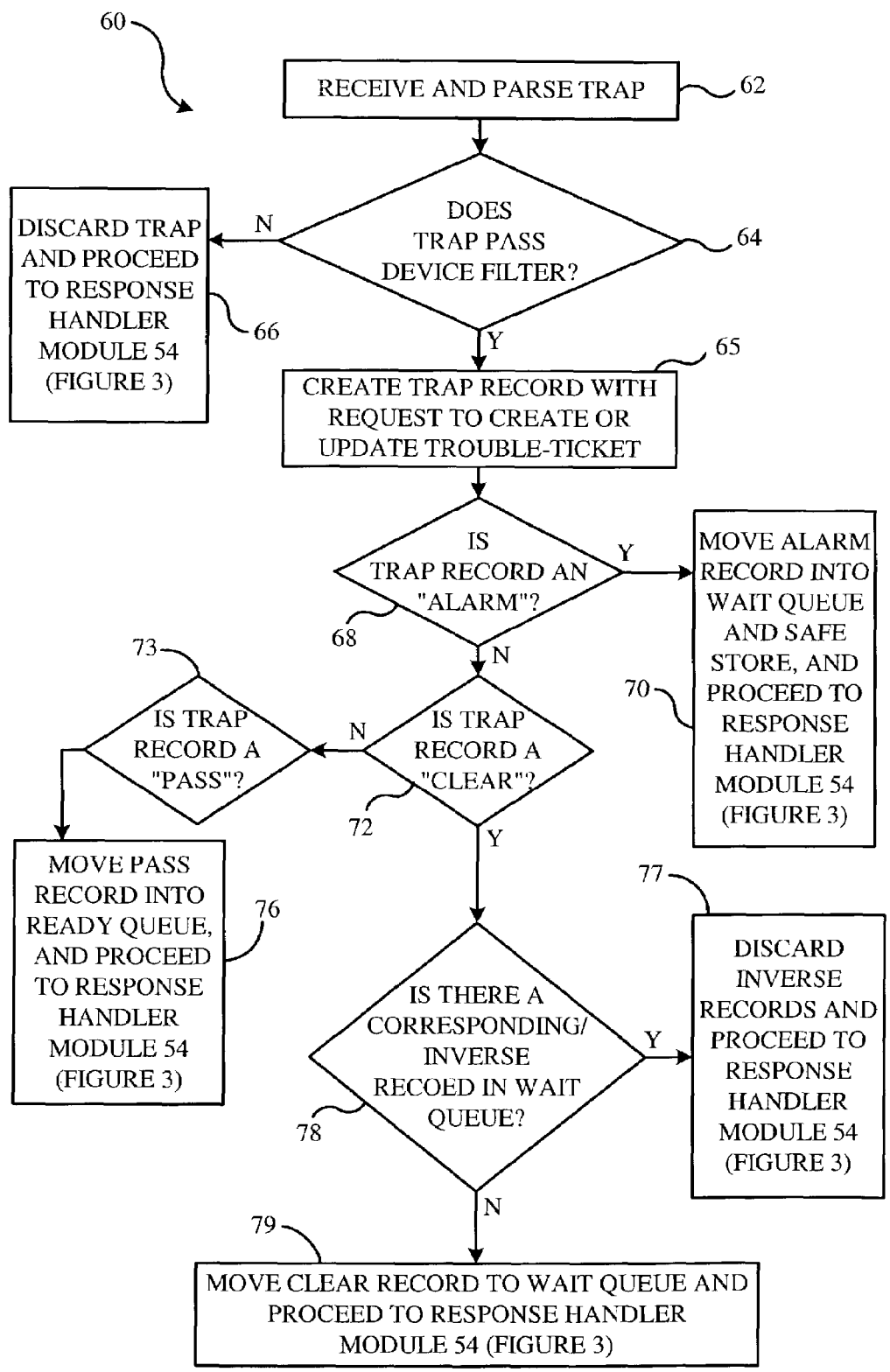
FIGS. 4-7 depict functionality of the Auto-Ticket Generator Client of FIG. 3 in greater detail.

Turning primarily to FIG. 4, the trap-handler sub-process 60 executed by the trap module 50 will be discussed in detail. Sub-process 60 begins at block 62 where client 23 receives a trap and parses the trap to extract information contained therein. The process then enters block 64 where a determination is made whether the fault message originated from a device predetermined to be of interest as specified by the contents of the input files loaded at startup. Restated, a determination is made whether the message received by client 23 may pass through a predetermined device filter of the client. That determination may be made based on a comparison between a trap-definition and trap-filter files loaded upon initialization and information contained in the trap including trap enterprise and trap specific, agent IP address and possibly port and/or station data.

If the received trap does not pass the trap filter of block 64, the trap is discarded and the process proceeds to the response handler module 54 as indicated at block 66. Otherwise, sub-process 60 passes to block 65 where Client 23 creates a trap record that, inter alia, includes a request to create a corresponding trouble-ticket (the request possibly being sent to Server 24 for fulfillment via block 99 of FIG. 6). Then the process passes to block 68 where the trap record is tested to determine whether the trap record is an "alarm," (i.e., the trap record includes fault data that indicates that a fault condition has occurred). That determination is made by comparison between the trap information and the trap-definition files loaded during initialization. If the trap record is an "alarm", sub-process 60 passes to block 70 where a number of functions are executed. These include placement of the alarm record into a wait queue and safe store (automatic duplication that serves as a backup so that, in the event that the client crashes, the information may be retrieved upon restart). The process then passes to response handler module 54 of FIG. 3.

If the trap record is not an alarm, it is tested at block 70 to determine whether it is a "clear," (i.e., the trap record indicates that a fault condition has ceased). That determination is preferably made by comparing the fault information with the trap-definition files loaded during initialization. If the trap record is a "clear", sub-process 60 passes to block 78 where a determination is made whether there is a corresponding and inverse record (Alarm) in the wait queue. As one example, "alarms" and "clears" are inverse trap records that, in accordance with the invention, automatically cancel one another provided they both originate from the same location (this is preferably determined by comparing the host, port and station of the two trap records). If there is an inverse trap record, the corresponding alarm record is removed from the wait queue and discarded at block 77 (because the "clear" negates the "alarm") and the process proceeds to response handler module 54 of FIG. 3. This aspect of the invention greatly reduces unnecessary messaging caused by the problem of network bouncing discussed above. If there is no inverse trap record, a clear record is moved into the wait queue at block 79 and the process proceeds to response handler module 54 of FIG. 3. Eventually, this clear record may be passed to the server in the form of a request and, assuming a prior alarm request has already been passed to the server, cancellation of the prior alarm can be performed by the server.

Returning now to consideration of block 72, if the received trap is not a "clear," the trap must be a "pass" trap (as noted at block 73) and the process proceeds to block 76 where the corresponding pass record is placed into the ready queue and the process proceeds to module 54. In accordance with the invention, a trap record is not (by definition) held in the wait queue for the time-out period. Restated, a pass record is immediately passed on to the server in the form of a request to take some desired action. In particular, a "Pass" record, by definition, has no inverse record and, therefore, there is no need to retain a pass record in the wait queue. This feature may be helpful where (unlike network bouncing) the detected fault conditions stand little or no chance of becoming resolved without operator intervention. For example, software failures, DRAM code checksum errors, etc, Thus, trouble-tickets for such traps are preferably immediately requested (see block 76 of FIG. 4).

Figure 5:
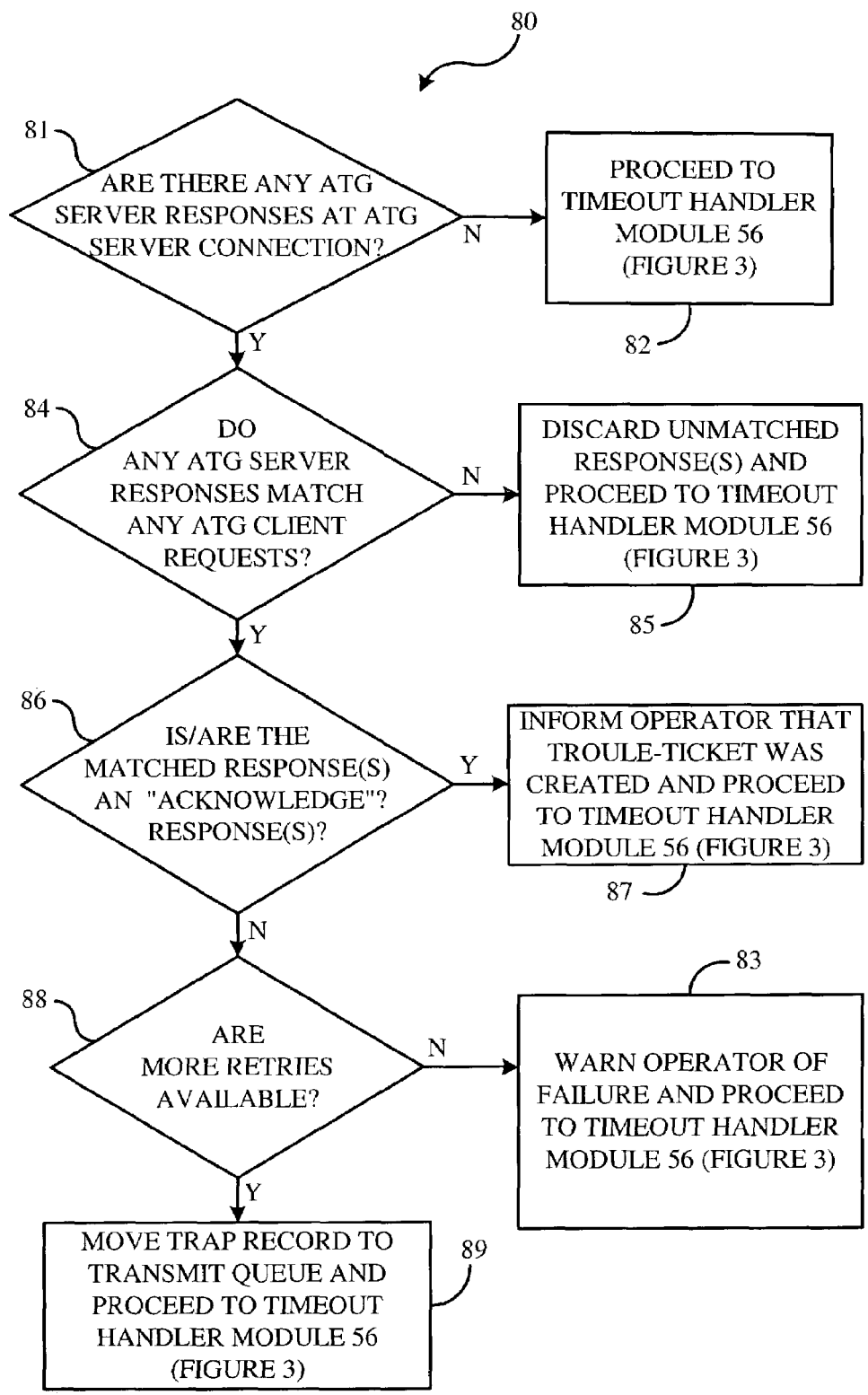

Turning primarily to FIG. 5, the response-handler sub-process 80 executed by the response handler module 54 will be discussed in detail. Continuing with the example discussed above, there should be no server responses at the server connection because, in this example, ATG Client 23 is processing the first trap received. Thus, sub-process 80 commences at block 81 which, in this case, confirms that no server responses are present at the connection. Therefore, sub-process 80 passes to block 82 and, then, to the timeout handler module 56 of FIG. 3 for further activity.

Temporarily assuming, however, that there is at least one server response that the server connection, block 81 yields a positive result and the process passes to block 84 where the server response(s) is/are tested to determine whether any of the server responses "match" (i.e., were generated in response to) any of the previously issued client requests. If not, the response is considered an erroneous, duplicate response and is discarded. The process then passes to time-out handler module 56 of FIG. 3. Otherwise, the process passes to block 86 where the "matching" responses are tested to determine whether or not they "acknowledge" that the client request was successfully fulfilled (i.e., a co-ticket was successfully generated). If so, a trouble-ticket identifier contained in the response is presented to the operator via the network monitoring tool and the process proceeds to the time-out handler module 56 of FIG. 3 via block 87. If not, the matching responses must be "non-acknowledgements" ("NAKs") and the process passes to block 88 where a determination is made whether there are any more retries available. If no retries are available, a failure must have occurred and the process passes to block 83 where the operator is warned of the failure and the process proceeds to the timeout handler module as described above. Otherwise, the record is placed in the transmit queue for transmission to the server 24 at block 89 so that another attempt to successfully generate/update a trouble-ticket can be made. Also at block 89, sub-process 80 proceeds to the time-out handler module 56 of FIG. 3 for additional activity as described immediately below.

Figure 6:
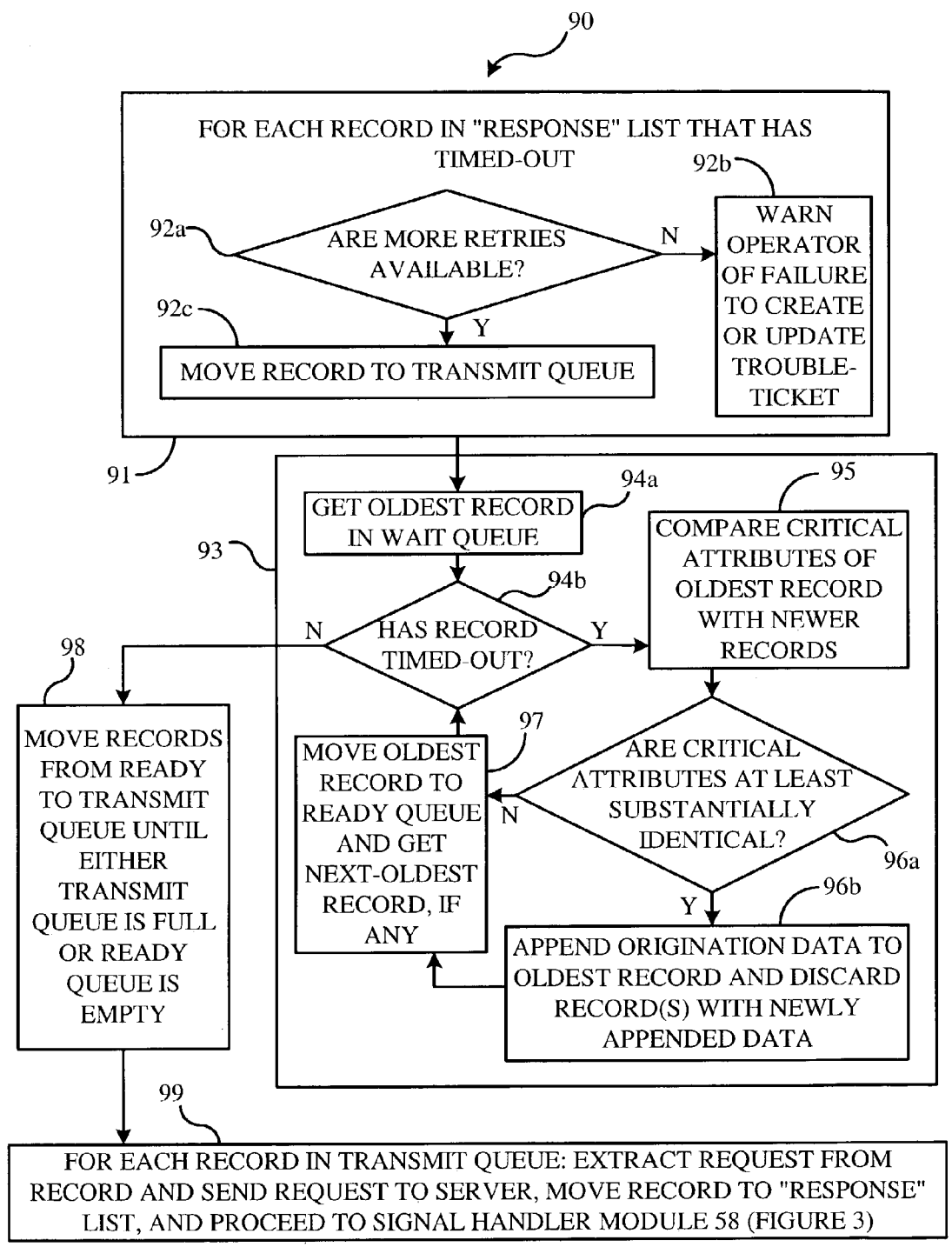
Figure 10:
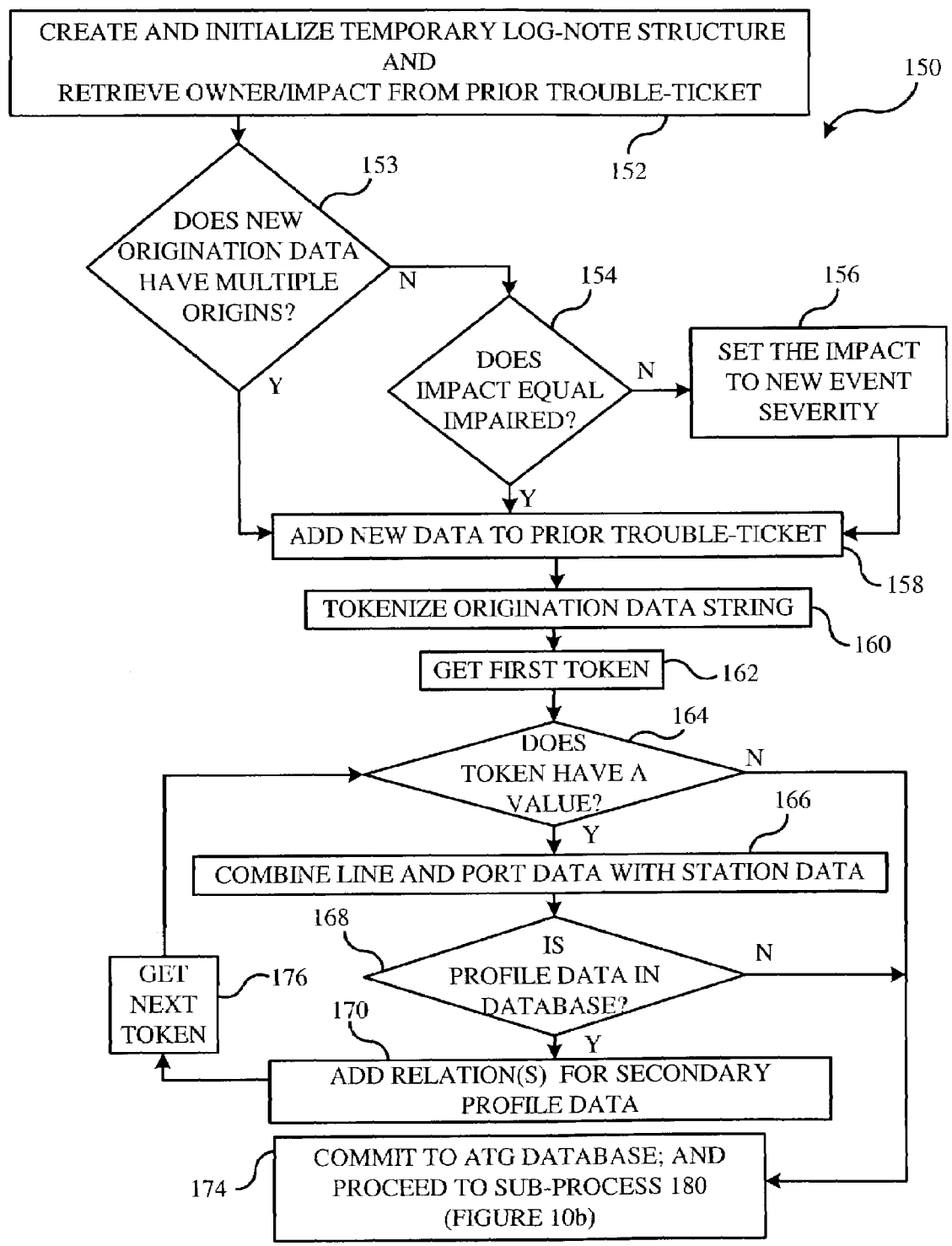
Figure 10:
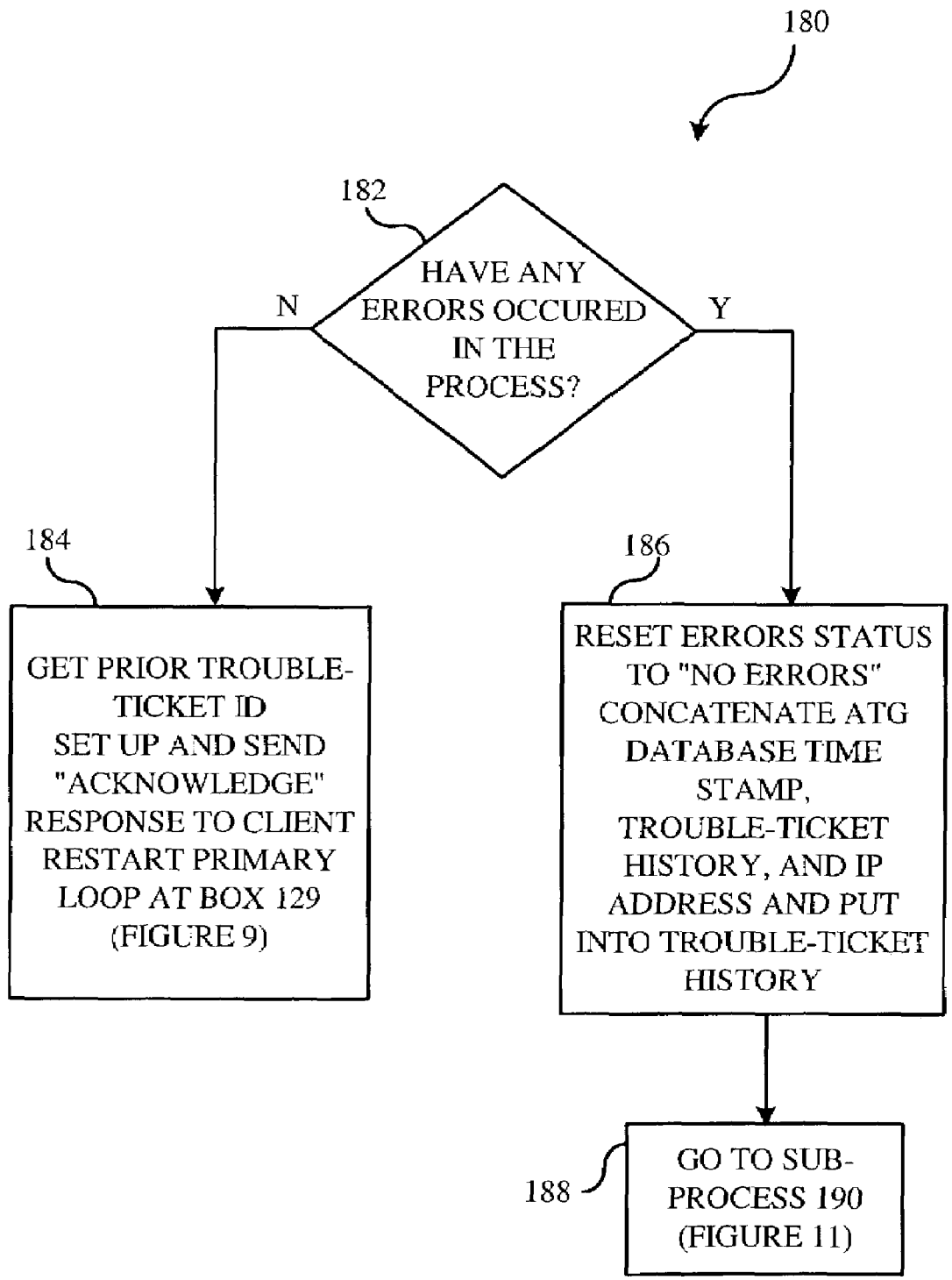

Turning primarily to FIG. 6, the timeout-handler sub-process 90 executed by the time-out handler module 56 will be discussed in detail. Once again, continuing with the primary case taken above, the first trap has been received and the process has now passed through blocks 42-54 of FIG. 3. It now executes a number of functions for each of the records in the "Response" list as shown in block 91. In particular, sub-process 90 enters block 92a (FIG. 6) where, for each record in the response list that has timed-out, it asks whether any more retries are available. If more retries are available the record is moved to the transmit queue at block 94c. If not, the operator is informed of the failure to properly open the ticket at block 92b. After all of the records in the "Response" list have been processed, the records of the wait queue are addressed as shown in block 93. In particular, the process proceeds to retrieves the oldest record in the wait queue (block 94a) and checks to see if it has timed-out at block 94b. If so, the critical attributes of the record under consideration (the oldest one presently in the wait queue) are compared with all of the newer records at block 95. The critical attributes are the fault condition and the origination data. If these critical attributes are at least substantially identical (as determined in block 96a), the origination data from the matching newer records is appended to the oldest record and the matching newer records are discarded at block 96b. This compression preferably comprises detecting records of the same trap type but that differ in originating location (i.e., records that have critical attributes are substantially identical) at block 96a, creating a single record that is applicable to plural locations at block 96b, and discarding the appended data newly incorporated into the compressed record (block 96b). Such aggregated records are subsequently decompressed by ATG Server 24 during generation of aggregated trouble-ticket as discussed in detail below with respect to FIGS. 10a and 12. The process then passes to block 97 where the function specified therein are executed.

If the critical attributes are not sufficiently close to warrant appending the data, the process passes to block 97 where the oldest record is moved to the ready queue and where the next oldest record in the wait queue is retrieved for consideration. If this record has timed-out the process, again, loops through blocks 95 through 97 as described above until all of the records in a selectable and predetermined timeframe have been processed. The process then passes to block 98 where the record(s) is/are moved from the ready queue to the transmit queue until either the transmit queue is full or the ready queue is empty. Sub-process 90 then proceeds to block 99 where for each record in the transmit queue, the request is extracted from the record and the request is sent to the server. Additionally, the record(s) is/are moved to the response list and the process moves to module 58 of FIG. 3 as discussed above. Regardless of whether a request is extracted from an "Alarm," "Clear," or "Pass" record, the request constitutes a request to the Server to create/update a trouble-ticket.

Upon discovery of records that have not timed-out, sub-process 90 passes to block 98 where these record(s) is/are moved from the ready queue to the transmit queue until either the transmit queue is full or the ready queue is empty. Sub-process 90 then proceeds to block 99 where for each record in the transmit queue, the request is extracted from the record and the request is sent to the server. Additionally, the record(s) is/are moved to the response list and the process moves to module 58 of FIG. 3 as discussed above.

With primary reference now to FIG. 7, the various client states and operator signals shown in sub-process 100 will now be discussed. As noted above, upon initialization client 23 defaults to a "run" state in which the client actively listens for one of a number of items as discussed above with reference to the active listening block 46 of FIG. 3. Client 23 is also capable of attaining "pause," "restart," and "terminate" states. In the "pause" state, client 23 disconnects from the network monitoring tool and, therefore, no longer receives additional traps. However, in the "pause" state, client 23 continues to process previously received traps until processing for the those traps is completed. In the "restart" state, client 23 is re-initialized and then enters the run state as discussed above with respect to block 44 of FIG. 3. The "restart" state can be useful if operator chooses to redefine various parameters in the input files and wishes them to take effect immediately. The "terminate" state effectively shuts down client 23 and, thus, client 23 will perform no further operations until it is initialized again. In accordance with a preferred embodiment of the present invention, an operator has the ability to switch the state of ATG Client 23 between those discussed above as desired.

Figure 7:
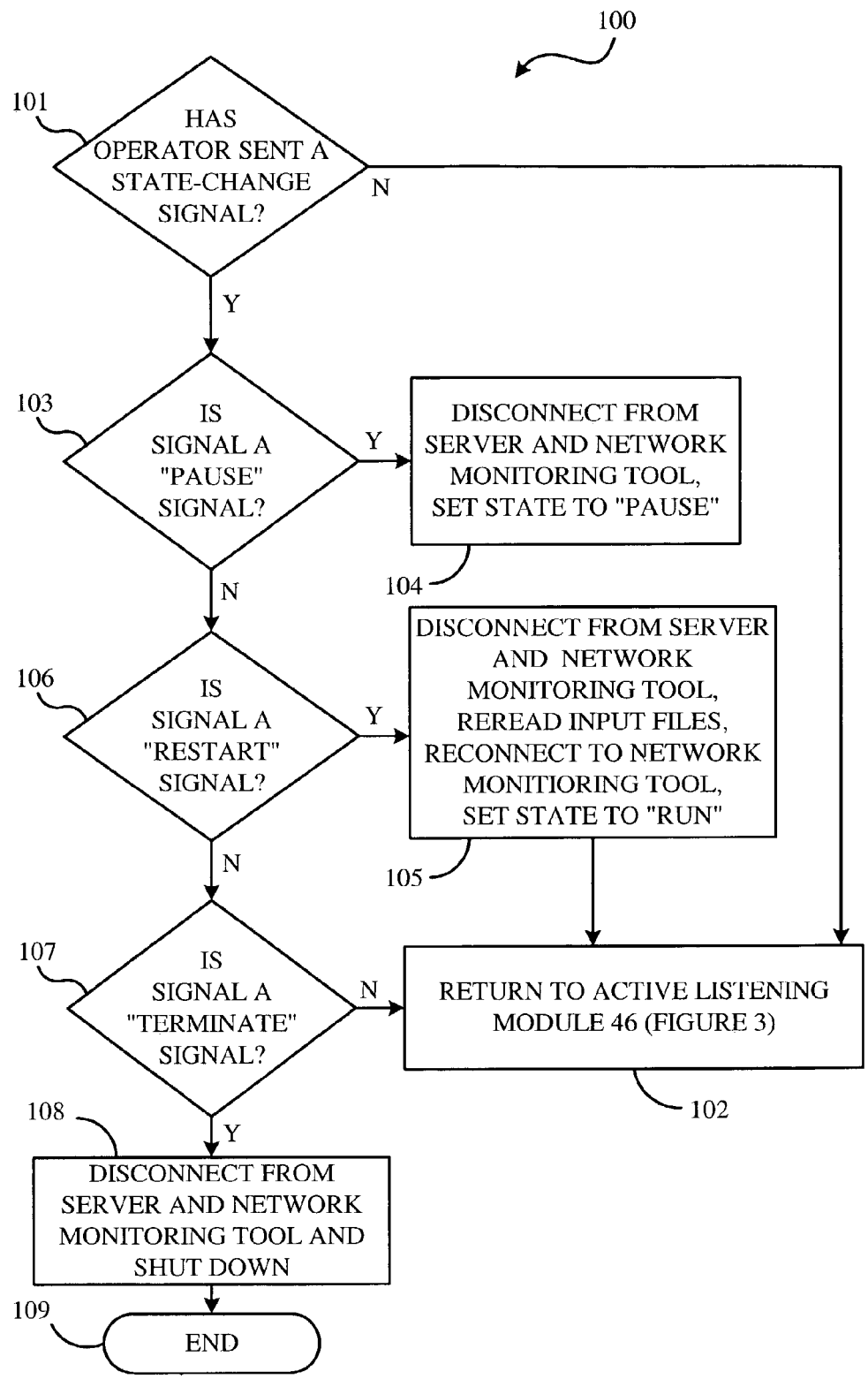

The sub-process 100 of FIG. 7 begins by asking if the ATG Client has received a state-change signal from operator O. In the trivial case in which no signal was received, the process returns to the active listening module 46 of FIG. 3 via block 102. Otherwise, the received signal is tested to see if it is a "pause" signal. If not, the process passes to block 106 where the received signal is tested to see if it is a "restart" signal. If not, the process passes to block 107 where the received signal is tested to see if it is a "terminate" signal. If not, the process returns to the active listening module 46 of FIG. 3 via block 102. If the signal is a "pause" signal, the ATG Client disconnects from server 24 and from the network-monitoring tool and sets the state to "pause" at block 104. The process then returns to the active listening module 46 of FIG. 3 via block 102.

If the signal is a "restart" signal, the process moves to block 105 where the ATG Client disconnects from the network monitoring tool; rereads the input files (discussed above); reconnects to the network monitoring tool; and sets the state to "run." Then, the process returns to the active listening module 46 of FIG. 3 via block 102. Finally, if the signal is a "terminate" signal, the ATG Client disconnects from server 24 and from the network monitoring tool and shuts down the ATG Client 23 at block 108 and client process 40 ends at 109.

Redirecting attention back to FIG. 3, the ATG Client functionality will now be described for cases other than receipt of the first trap as discussed above. In particular, the following discussion assumes that the ATG Client has reached an operating condition in which various traps, requests, responses and signals have been and are present at various stages of processing in the inventive ATG. In such a case, client process 40 may receive an ATG Server response at block 46. Since the item is not a trap the process will pass through blocks 48 and 52 to block 54 where it will be processed as previously described with respect to sub-process 80 of FIG. 5. Additionally, the process will pass through blocks 56 and 58 and return to block 46 as previously described.

If the client has timed-out, client process 40 will pass through blocks 48, 52 and 55 to block 56 where it will be processed as previously described with respect to sub-process 90 of FIG. 6. Additionally, the process will pass through block 58 and return to block 46 as previously described. If the ATG Client receives a state-change signal at block 46 the process will pass through blocks 48, 52, 55 and 57 to block 58 where it will be processed as previously described with respect to sub-process 100 of FIG. 7 and return to block 46 as previously described.

With reference now to FIGS. 8a and 8b, there is shown therein the of type data exchanged between the Auto-Ticket Generator Client and Server during Request/Response messaging. More particularly, FIG. 8a illustrates representative data that will be extracted from a given trap, placed in a record and then sent to the server for further processing. For example, the server will typically use such information to execute the various functions shown and described with respect to FIGS. 9-12.

Similarly, FIG. 8b illustrates representative data that is returned from the server to the client for further processing. Typically, the client will use such information to control further server messaging processes and operator messaging processes as shown and described with respect to FIGS. 2-7.

With the functionality of the ATG Client now described for several varying cases, those of ordinary skill will readily understand various other possible operational scenarios without the need for further explication. Therefore, emphasis will now be shifted to deeper consideration of the functionality of the ATG Server.

Figure 9:
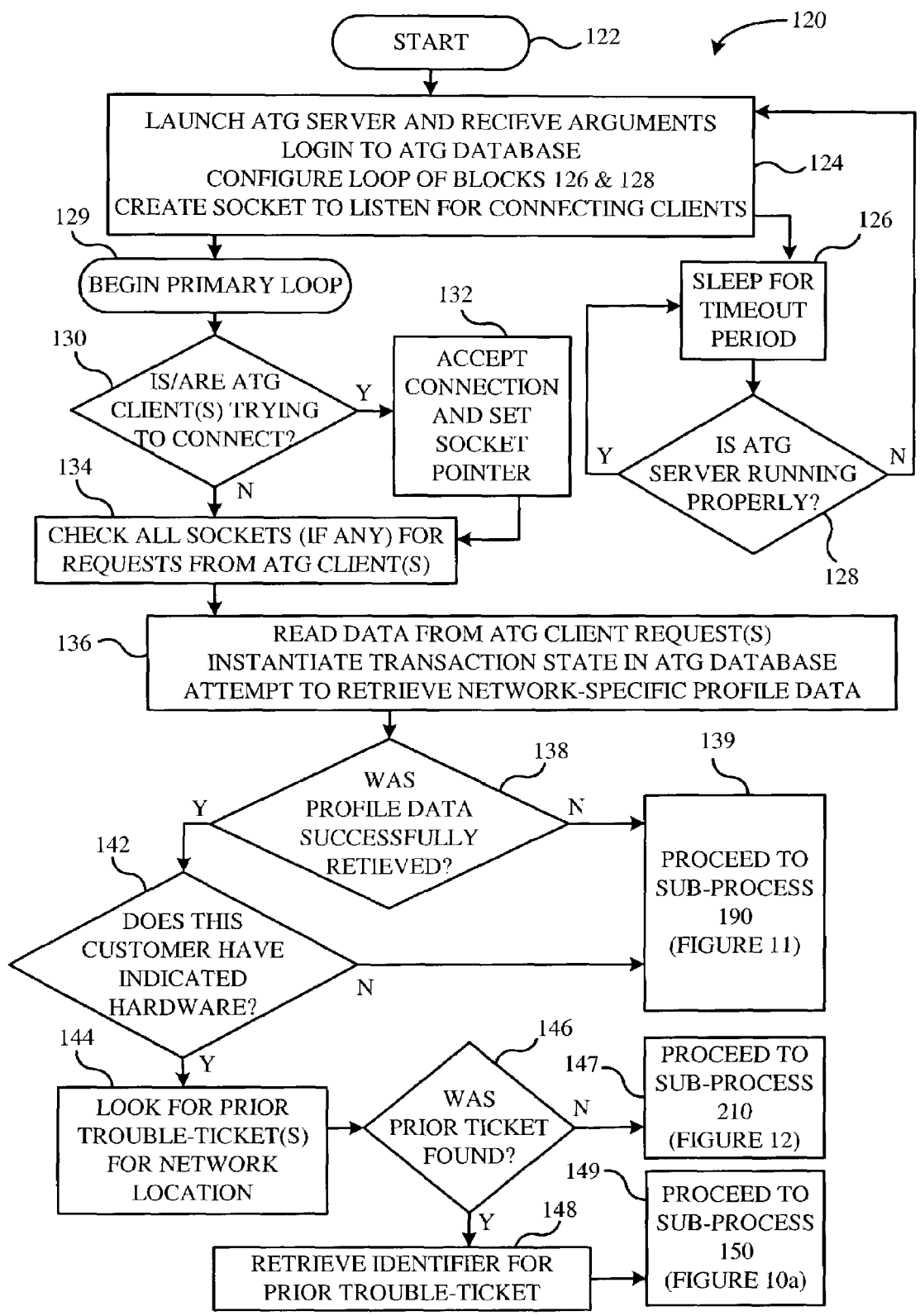
FIGS. 9-12 illustrate functionality of the Auto-Ticket Generator Server in accordance with one preferred embodiment of the present invention.

With a joint reference now to FIGS. 9 through 12, there is shown therein flow charts illustrating functionality of the auto-ticket generator server in accordance with a preferred embodiment of the present invention. With particular reference to FIG. 9, server functionality is partially illustrated in process 120 which starts at block 122 and proceeds to block 124 where the server begins execution. At block 124, the server receives a number of parameters as it is launched and uses those parameters in order to (1) login to the auto-ticket generator database (i.e., the ATG Database); (2) configure the "while loop" of blocks 126 and 128 (e.g., specify a predetermined timeout value (preferably five seconds) for the while loop); and (3) create a client-socket to listen for connecting clients. The parameters may include socket identifiers (for sockets to be monitored for client interaction); ATG Database name, login name, password; and server identifier. In response to logging into the ATG Database, the server receives a database identifier that enables it to continually communicate with the ATG Database without repeated authentication.

Process 120 then passes to blocks 126 and 128 where the server periodically checks a task manager to determine whether a server crash has occurred. If no such fault has occurred, the system simply sleeps for the predetermined timeout period and, once again, checks the task manager to determine whether a crash has occurred. This process runs independently from the processes discussed herein and repeats on a regular basis until a fault has been detected. At that point the process passes back to block 124 where the server is again launched. In this way, the server is able to automatically restart itself if the server crashes and, therefore, improves reliability and reduces down-time of the present invention.

Process 120 also passes from block 124 to block 129 which marks the return point for a process loop which spans FIGS. 9 through 12. Proceeding to block 130, the process checks the predetermined client-socket to determine whether one or more clients are trying to connect with the server. If so, the server accepts the connection(s) with the client and will negotiate with the client(s) for another socket to conduct further communications with that client. Further, a socket pointer for the negotiated socket is set at block 132. The process then passes to block 134 where all of the previously established client sockets (if any) are checked for client requests. If no client is trying to connect with the server, the process also passes to block 134 and executes the aforementioned functionality. Process 120 then passes to block 136 where (1) data is read from the client request(s) present at socket(s); (2) a "transaction state" is instantiated in the ATG Database so that the data may be preliminarily manipulated/specified and committed to the Database only after it has been verified; and (3) an attempt is made to retrieve network-specific profile data (from the database) that corresponds to the origination data read from the client request(s).

Once the functions of block 136 are performed, the process passes to block 138 where the process attempts to determine whether the network-specific profile data was successfully retrieved. If the corresponding network-specific profile data was found in the ATG Database, process passes to block 142 where it is determined whether the faulty device belongs to the customer identified in the client request. This helps to verify data integrity early in the process in that it eliminates the possibility that errors could arise due to two or more customers having duplicative network components. If the network-specific profile data could not be retrieved based on the origination data of the client request, the process passes to sub-process 190 of FIG. 11 (via block 139) where an attempt will be made to generate a generic trouble-ticket which (at least) contains some of the actual fault data even if generation of a comprehensive trouble-ticket is not possible. Resuming the process from block 142, the process passes to blocks 144 and 146 if confirmation that the retrieved profile data belongs to the customer identified in the origination data was received. In blocks 144 and 146 the ATG Database is searched for previously recorded trouble-tickets referencing fault conditions that originated from the location in the past. If no previous trouble-ticket(s) is/are found, the process passes to block 147 in preparation for the creation of an entirely new trouble-ticket. If, however, a related trouble-ticket has already been created, the prior ticket identifier is retrieved so that the newly received information may be logged in (i.e., incorporated into) the prior trouble-ticket by a sub-process 150 (FIG. 10*a*).

In sum, regardless of the decision-making that occurs in blocks 138 through 148, the process either passes through block 139 to sub-process 190 (FIG. 11) where an attempt is made to establish a generic trouble-ticket in the ATG Database; or through block 147 to sub-process 210 (FIG. 12) where a new trouble-ticket is established in the ATG Database; or through block 149 to sub-process 150 (FIG. 10*a*) where the newly received information is incorporated into the prior trouble-ticket of the ATG Database.

With primary reference now to FIG. 10*a*, sub-process 150 will now be described in greater detail. Sub-process 150 begins at block 152 where a temporary log note structure is created and is initialized with default values to prevent data corruption. Additionally, information indicative of the device owner and the fault severity (i.e., impact) of the detected fault condition are retrieved at block 152. In a preferred embodiment, there are three levels of fault severity: normal (indicating either that no fault has occurred or that the monitored device has returned to normal status from a previous fault), impaired (indicating that the monitored device has lost some, but not all, functionality), and hard-down or crash (indicating that the monitored device is not communicating with the monitoring system as expected). Those of ordinary skill in the art will readily appreciate that the present invention is compatible with virtually any number of levels of fault severity and a wide range of fault types. Accordingly, ordinary artisans will readily understand how to apply the present invention to a wide variety of fault schema based on the disclosure contained herein.

The newly received data is tested at block 153 to determine whether it has multiple origins (i.e., whether it was compressed by client 23 at block 96*b* (FIG. 6)). For example, in a preferred embodiment origination data compression specifies a single line and port that have multiple faulty stations. Compression is achieved by listing plural faulty stations in short form. For each of these stations, it is, thus, understood that they all reside at the single line and port identified. At block 153, the newly received data, is preferably tested to determine if the origination data message string is an aggregated message string containing aggregated origination data for plural faulty network components. If so, the process passes to block 158 where the new data is added to (i.e., logged into) the previously identified corresponding prior trouble ticket without processing the impact level. This is because, in the case of a compressed or aggregated error message, fault conditions may be eliminated at some, but less than all, of the originating network components. Where that is true, it is important to not misleadingly change the impact data in the manner to be discussed with respect to blocks 154 and 156. Thus, the data should be incorporated into the prior ticket without further processing (such as that of blocks 154 and 156) to preserve its integrity.

Looking at the case of singular origination, the process passes to block 154 where a determination is made whether the impact of the fault condition is equal to impaired (i.e., indicating that the monitored network has experienced a non-fatal fault). If so, that information remains unchanged and the prior trouble-ticket will remain open (unless it is manually closed by an operator) and additional information regarding the impairment may be freely added and reviewed. This feature beneficial in that it provides the operator with more control over the system if the detected fault condition is an impairment. The process then passes to block 158 where the new fault information is added to history field of the previously identified prior trouble-ticket. The process then passes to block 160 where the origination data string (containing the aggregated origination data for multiple faulty locations) is tokenized to separate the station-data for the various origins and the process passes to block 162 where a first token is retrieved. The process then loops through blocks 164-176 where the aggregated origination data string is decompressed for this station-token. In particular, the token is tested at block 164. If the token has a value, the station data is combined with the line and port at block 166 resulting expanded origination data is now in a form that permits retrieval in the corresponding profile data of the database, if any. Thus, the expanded origination data is then used in an attempt to retrieve corresponding network-specific profile data from the database at block 168. If the profile data is found, the process passes to block 170, where the database relation for this profile data is logged into the prior ticket as secondary profile data to indicate that, in this instance, the trouble-ticket relates to multiple faulty locations including by a single "main" and plural "secondary" locations. Then, at block 176, the next token is retrieved and the process begins another iteration of the loop starting with block 164.

If, at block 164, it is determined that the token does not have a value, the process passes to block 174 where the newly updated trouble-ticket is committed to the database and where the process passes to sub-process 180 of FIG. 10*b*. If, however, at block 164, the token is found to have a value, the process will pass through block 166 as discussed above and into block 168. If, at this point, the network-specific profile data is not found in the database, the process passes to block 174 where the newly updated trouble-ticket is committed to the database and where the process passes to sub-process 180 of FIG. 10*b*. Otherwise, another secondary relation is set at block 170 and the process loops back to block 164 through block 176 (where the next token is retrieved). Looping continues until a token without a value is retrieved (i.e., there are no more stations with this fault condition) and the process passes to sub-process 180 via block 174 as discussed above.

With primary reference now to FIG. 10*b*, sub-process 180 begins with block 182 where a determination is made whether any errors have occurred at any prior point in the process. If not the process then passes to block 184 where an "acknowledge" (i.e., "ACK") response is set up for subsequent delivery from the ATG Server to the ATG Client that issued the request (to open a trouble-ticket) to which the ATG Server is responding. This message tells the client that the fault condition has been appropriately noted in the ATG Database (for example, by logging data into a prior trouble-ticket or by generating a new trouble-ticket) and an operator should be informed of that fact so that the operator knows to retrieve the appropriate trouble-ticket and take corrective action based on the information contained therein. The preferred steps for completing the ACK are set forth in block 184 and upon sending the ACK, the process restarts the loop described above by returning to block 129 and executes the steps following from that point. If, instead, an error was detected in block 182, the process executes the steps noted in block 186 and goes to sub-process 190 of FIG. 11 via block 188. It will be appreciated that, in some instances, ATG server 24 may encounter some errors in attempting to open a comprehensive trouble-ticket.

Briefly returning now to FIG. 10*a* for further consideration of sub-process 150, if the impact is not equal to impaired, the process passes to block 156 where the fault severity level is set (e.g., normal, hard-down, etc.) and process passes to block 158 for processing as indicated above.

Figure 11:
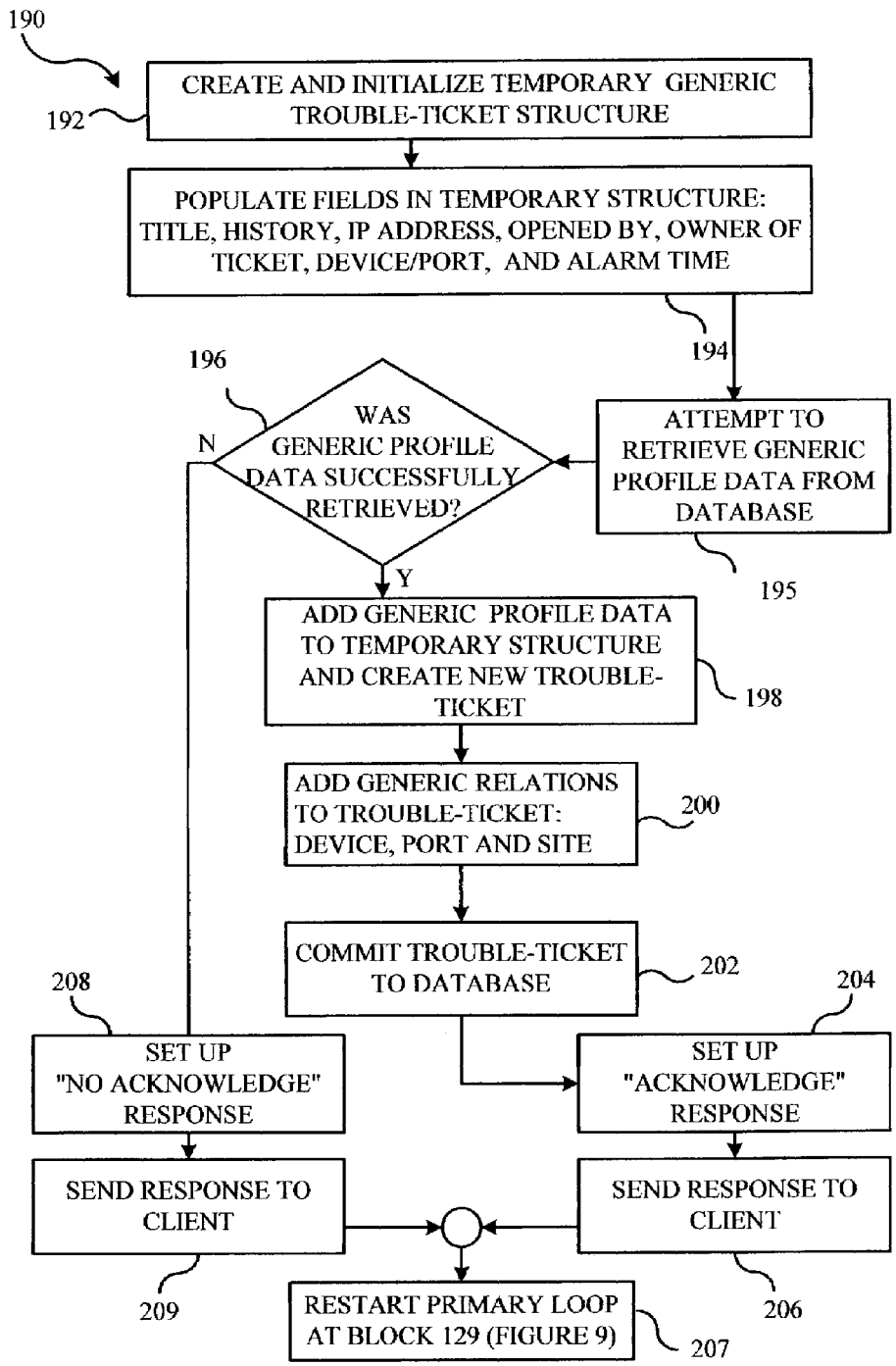

With primary reference now to FIG. 11, sub-process 190 for generating a new generic, or partial, trouble-ticket when a comprehensive ticket cannot be generated will now be described in greater detail. Sub-process 190 begins at block 192 where temporary generic data structure is created. Additionally, that trouble-ticket structure is initialized with default values to prevent data corruption. The process then populates a number of fields in the temporary generic data structure with origination data from the client request at block 194. These fields preferably include title, history, IP address, opened by, owner of ticket, owner of trouble-ticket, device type, alarm time, etc. Since it was previously determined (see block 139 of FIG. 9) that corresponding network-specific profile data could not be retrieved for this origination data, this portion of the process attempts to, nonetheless, provide the operator with some generic profile data that may be manually replaced as trouble shooting of the fault condition occurs. In order to achieve this, the origination data is used here to try to retrieve corresponding generic profile data from the ATG Database. Restated, an attempt is made to find data in the database that serves a place-marker in the trouble-ticket in lieu of actual network-specific profile data. Once this attempt has been made, the process then passes to block 196 where it is determined whether the generic profile data was successfully retrieved. If not, a trouble-ticket cannot be generated due to a lack of fundamental information and the process passes to block 208 where a "no acknowledge" (i.e., "NAK") response is set up for subsequent delivery from the ATG Server to the ATG Client that initiated the connection with the ATG Server. This message tells the client that neither a comprehensive nor a generic trouble-ticket could be created and that the operator should be informed of that fact so that the operator knows to attempt corrective action using the conventional process of manually opening a trouble-ticket. The NAK is sent at block 209 and the process restarts the loop described above by returning to block 129 (via block 207) and executing the steps following from that point.

On the other hand, if the generic profile data was successfully retrieved from the database, the process passes from block 196 to block 198 where a new generic trouble-ticket is created in the ATG Database and where the retrieved generic profile data is added to the temporary generic structure. At block 200 the process adds various generic relations to this structure so that the appropriate data may be retrieved and displayed to an operator on a GUI in the form of a partial bundled error message. Those of ordinary skill in the art will readily appreciate that a wide variety of other types of data that may be linked to the trouble-ticket as desired.

Once these relations have been set, the process passes to block 202 where the relations are committed to the ATG Database and the process then passes through blocks 204 and 206 and where a "acknowledge" (i.e., "ACK") responsive message is set up and sent to the ATG Client that initiated the connection with the ATG Server. This message tells the client that the requested trouble-ticket was created and an operator should be informed of that fact so that the operator knows to retrieve the trouble-ticket and take corrective action based on the information contained therein. The process restarts the loop described above by returning to block 129 (via block 207) and executing the steps following from that point.

Figure 12:
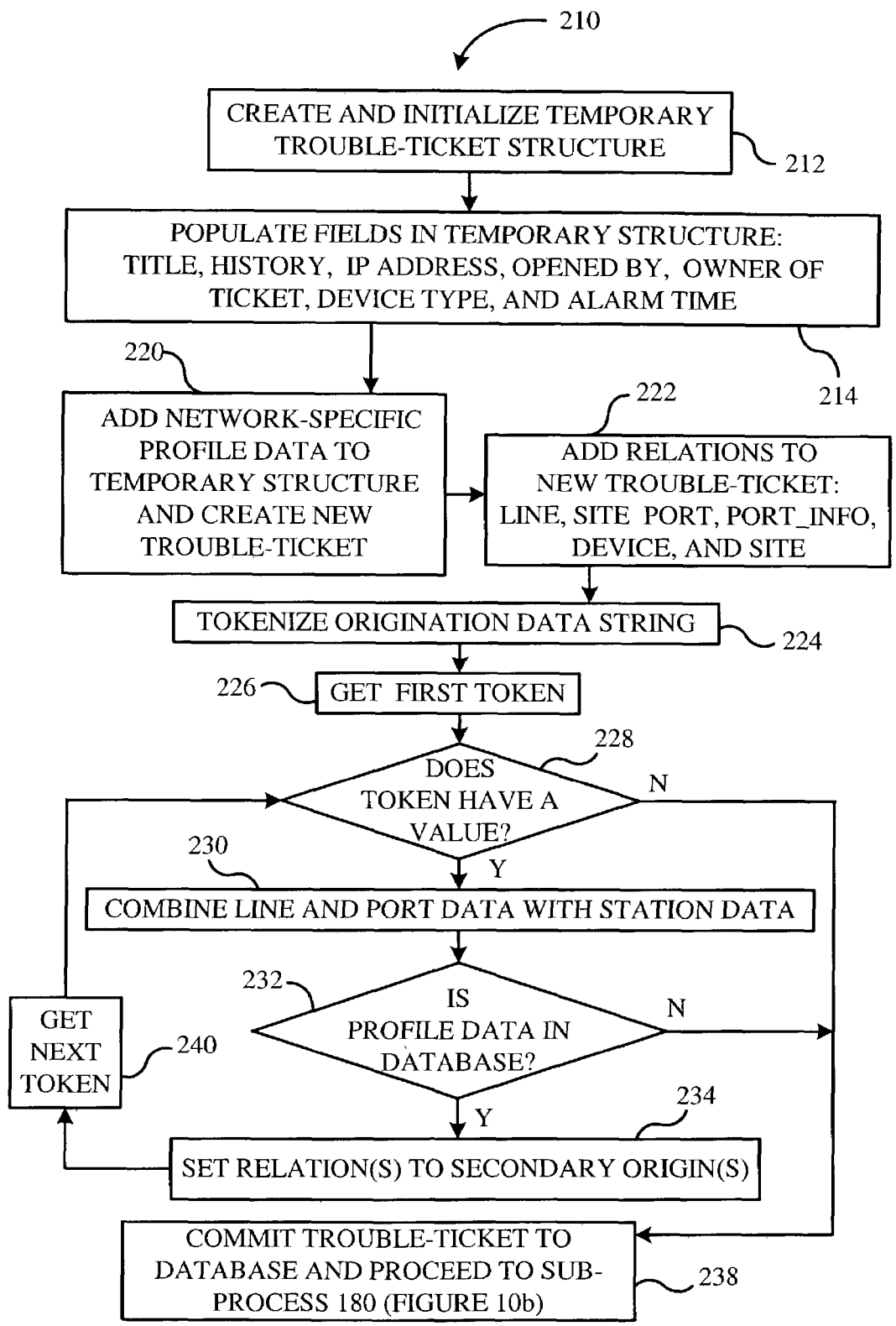

With primary reference now to FIG. 12, sub-process 210 for generating a new comprehensive bundled error message will now be described in greater detail. Sub-process 210 begins at block 212 where a temporary trouble-ticket data structure is created and initialized with default values to prevent data corruption. The process then populates a number of fields in the temporary data structure at block 214 using the origination data from the client request. These fields preferably include title, history, IP address, opened by, owner of ticket, owner of trouble-ticket, device type, alarm time, etc. Since this origination data was previously used to retrieve the corresponding network-specific profile data from the ATG Database (see blocks 136 and 138), the process may pass from block 214 to block 220 where a new trouble-ticket is created based on the temporary data structure and the retrieved profile data is added to the new trouble-ticket. At block 222 the process adds various relations for this trouble-ticket so that desired data may be retrieved and displayed to an operator on a GUI in the form of a comprehensive bundled error message. The relations are preferably links to tables of information previously stored in the ATG Database which may include customer personnel contact information for a particular network component, detailed hardware data for the origin of the trap (e.g., for a line this may include the name of a third-party provider of the line, contact information for the third-party provider, the type of line, etc.). In a particularly preferred embodiment, the relations that are set in block 222 include the following information: connections information such as segment, device port, site name, device name, status, vendor, and vendors phone. Site information such as customer site name, site contact info (first and last name), site phone, alternate contact information, address, region, and district. Device information such as device name, device address DLCI, Wan IP, Backup circuit, local loop ID, Serial number, host Icon, internal ip, backup port, and NAT IP address. Line info. Line name, line type, circuit ID, vendor, hub device name, hub device port, etc., Those of ordinary skill in the art will readily appreciate that a wide variety of other types of data that may be linked to the trouble-ticket as desired. For example, if desired, such information may include billing, service contract level (e.g., 24/7, 24/5, 8/5), past invoicing, and system usage data to facilitate billing of the customer for correcting the detected fault.

Once these relations have been set in the trouble-ticket, the process passes to block 224 where the message string containing the aggregated origination data for multiple faulty locations is tokenized to separate the station data for the various origins and the process passes to block 226 where a first token is retrieved. It will be appreciated that in the simple case of a ticket of singular origin, the token-handling process discussed below is largely averted and the process passes quickly to block 238. In the case of multiple origins, however, the process loops through blocks 228-240 where the aggregated origination data string is decompressed. In particular, the token is tested at block 228. If the token has a value, the station data is combined with the line and port at block 230 resulting expanded origination data is now in a form that permits retrieval in the corresponding profile data of the database, if any. Thus, the expanded origination data is then used in an attempt to retrieve corresponding network-specific profile data from the database at block 232. If the profile data is found, the process passes to block 234, where the database relation for this profile data is added to the ticket as secondary profile data to indicate that the trouble-ticket relates to multiple faulty locations including by a single "main" and plural "secondary" locations. Then, at block 240, the next token is retrieved and the process begins another iteration of the loop starting with block 228.

If, at block 228, it is determined that the token does not have a value, the process passes to block 238 where the newly updated trouble-ticket is committed to the database and where the process passes to sub-process 180 of FIG. 10b. If, however, at block 228, the token is found to have a value, the process will pass through block 230 as discussed above and into block 232. If, at this point, the network-specific profile data is not found in the database, the process passes to block 238 where the newly updated trouble-ticket is committed to the database and where the process passes to sub-process 180 of FIG. 10b. Otherwise, another secondary connection relation is set at block 234 and the process loops back to block 228 through block 240 (where the next token is retrieved). Looping continues until a token without a value is retrieved (i.e., there are no more origins with this fault condition) and the process passes to sub-process 180 via block 238 as discussed above.

With joint reference now to FIGS. 13a through 13e, there is shown therein a series of pages from a representative ATG database GUI 250 on which on illustrative trouble-ticket (or bundled error message) is displayed. The preferred GUI is based on the ClearSupport client that complements the Clarify Database server. However, it should be noted that selection of an appropriate database and GUI is a mere matter of design choice and not part of the invention. As shown, the trouble-ticket includes two instances of an identifier 252/252' that refers to the ATG Database entry created by the ATG Server in response to a request from the ATG Client related to a fault condition. The upper half of the GUI displays a wealth of other information contained in the trouble-ticket and preferably displayed on each of GUI pages of FIGS. 13a-13e. Naturally, this arrangement ensures that the operator has ready access to the displayed information throughout the trouble-shooting process. The displayed information includes: the customer name 254 (which refers to the name of the customer with the network that has the fault condition), the line name 256 (which includes the origination data: the customer host name "TC 78802_3567", and an associated port identifier suffix—in this case P8852—and refers to the line and port where the fault condition has occurred), circuit identifier 258 (which refers to the telephone provider access circuit number), node name 259 (which refers to the device name at the customer site where the fault occurred), owner/impact (fault severity) level 260 (which identifies owner of the faulty equipment such as a telephone company, the Network Operations Center, the customer, etc.), current status 261 (which refers to the current state of the trouble-ticket), problem description 262 (which the origination data—port 8852 and station 58—for the fault condition as well as an indication of the status of the device—in this case—LINK DOWN) (see also history field 316 of FIG. 13e), primary site identifier 264 (which refers to the hardware site ID), site identifier 266 (which refers to the internal unique site identifier of the ATG Database), owner 268 (which refers to the operator who is attempting to resolve the fault condition), time stamps 269 (which refer to the dates and times of the major events associated with detection and correction of a fault condition), and owner's ticket identifier 270 (which refers to the equipment owner's internal ticket identifier for a trouble-ticket that may have been internally generated by the equipment owner. For example, if AT&T is responsible for an outage, the owner's ticket identifier will be an identifier for an AT&T ticket). A series of active buttons 272 are also available for performing various functions as indicated therein and will be readily understood by those of ordinary skill in the art.

The lower half of the trouble-ticket displayed in GUI 250 preferably includes a plurality of tabbed windows 274 that may be selected for display of information contained therein. With primary reference to FIG. 13a, the "connections" 276 tab has been selected to thereby display a window 277 containing a plurality of entries 275a-275d corresponding to the network components experiencing the fault condition that resulted in generation in this ticket. In the case shown in window 277, four different stations (58, 71, 81 and 91) of a single port (8852) have all crashed (see problem field 262) and station 58 has been assigned as the primary station (see especially, "Status" field (++++) of window 277).

Figure 13:
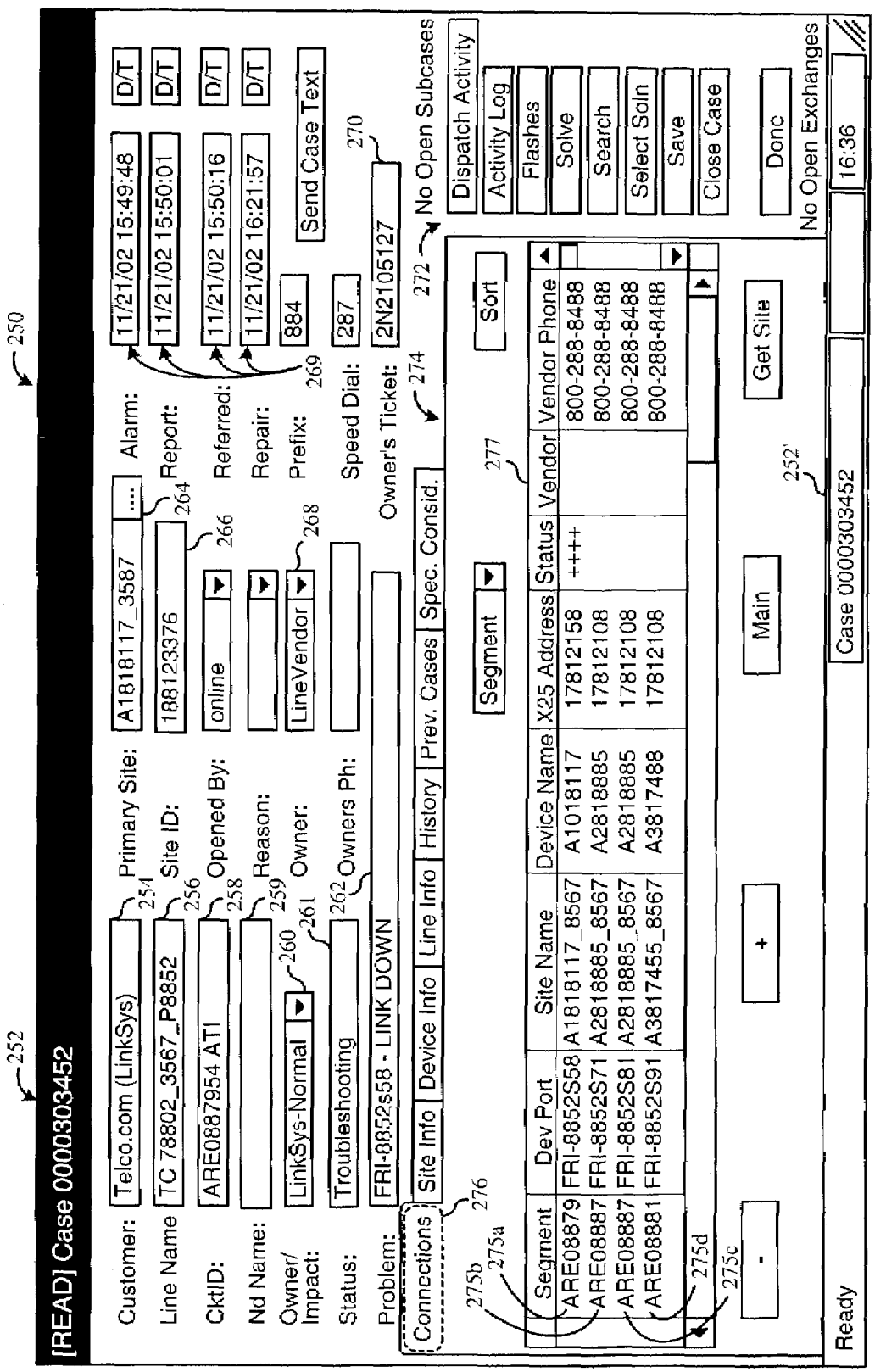
FIGS. 13a-13e depict various pages of an ATG Database GUI in accordance with one preferred embodiment of the present invention.
Figure 13:
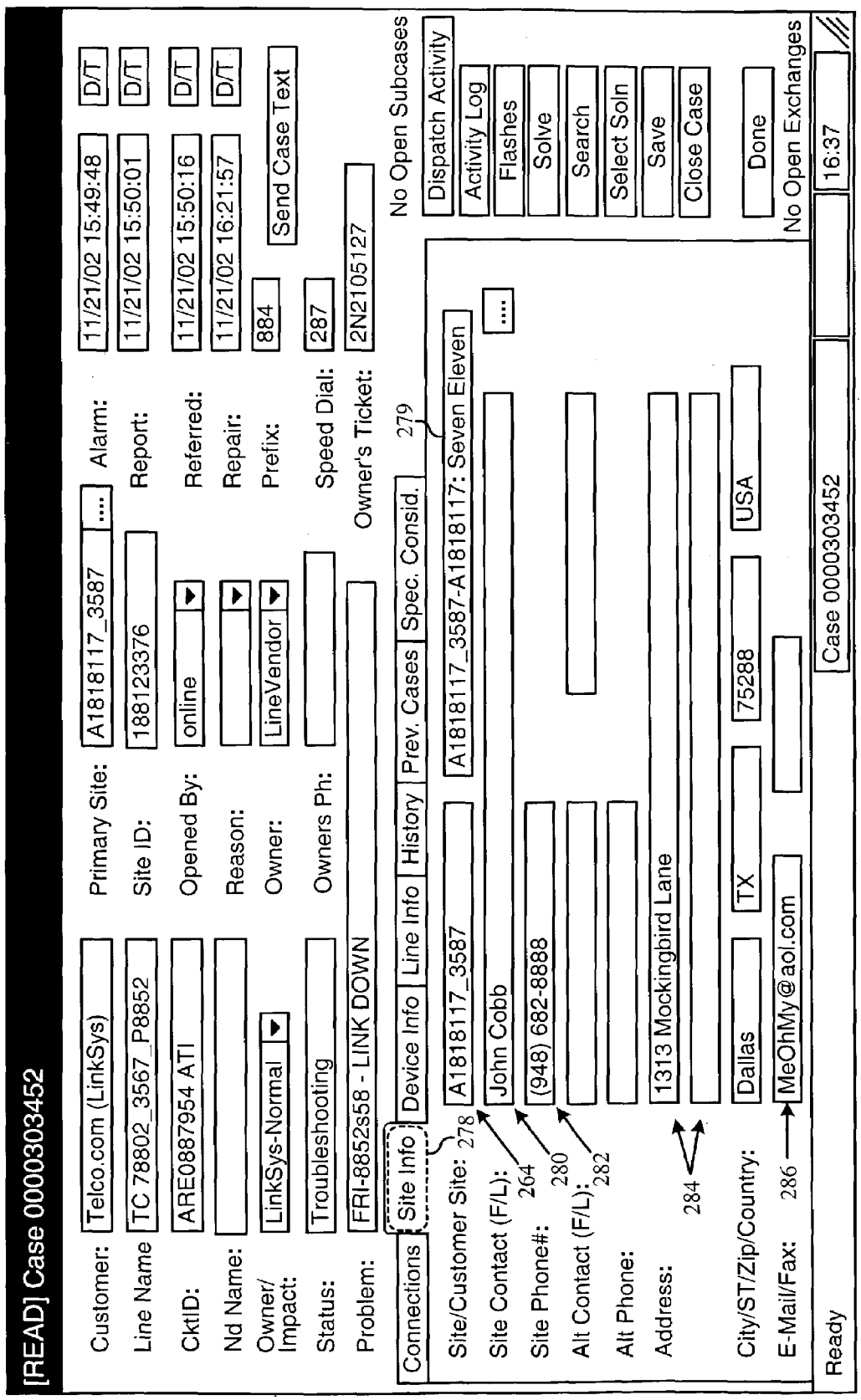

With primary reference now to FIG. 13b, in this page of the GUI, the "Site Info" tab 278 has been selected to thereby display a plurality of predetermined connection information stored in the ATG database and describing the physical location where the reported fault condition occurred. This information includes: Site 264 (which refers to the name of the site where the fault condition occurred), Customer Site 279, (which includes the "site" and the name the customer uses for the site), Site Contact 280 (which refers to the first and last name of the contact person at the site where the fault condition occurred), Site Phone # 282 (which refers to the phone number at the site where the fault condition occurred), Address 284 (which refers to the physical address at the site where the fault condition occurred), E-mail/Fax 286 (which refers to the e-mail/fax numbers at the site where the fault condition occurred), etc.

With primary reference now to FIG. 13c, in this page of the GUI, the "Device Info" tab 290 has been selected to thereby display a plurality of predetermined "static" information stored in the ATG database and describing the attributes 292 and 294 of the device with the reported fault condition. This information includes: Device Name (which refers to the name of the hardware), Device Address, (which refers to the virtual address where the fault condition occurred (i.e., a x25 address)), Model No (which refers to the model number of the device where the fault condition occurred), Serial Number (which refers to the serial number of the device at the site where the fault condition occurred), Installation Date (which refers to the installation date of the faulty device), Various IP Addresses (which ensure that the operator can access the device of interest) including the Wan IP (the wide-area network IP address for the customer); LAN IP (the local area network IP address of the customer's front end), and the Internal IP: (which constitutes a translated version of the LAN IP used within the network-operations-center) what the NOC see the IP address as the same as the NAT IP address in most cases), etc.

Figure 13D:
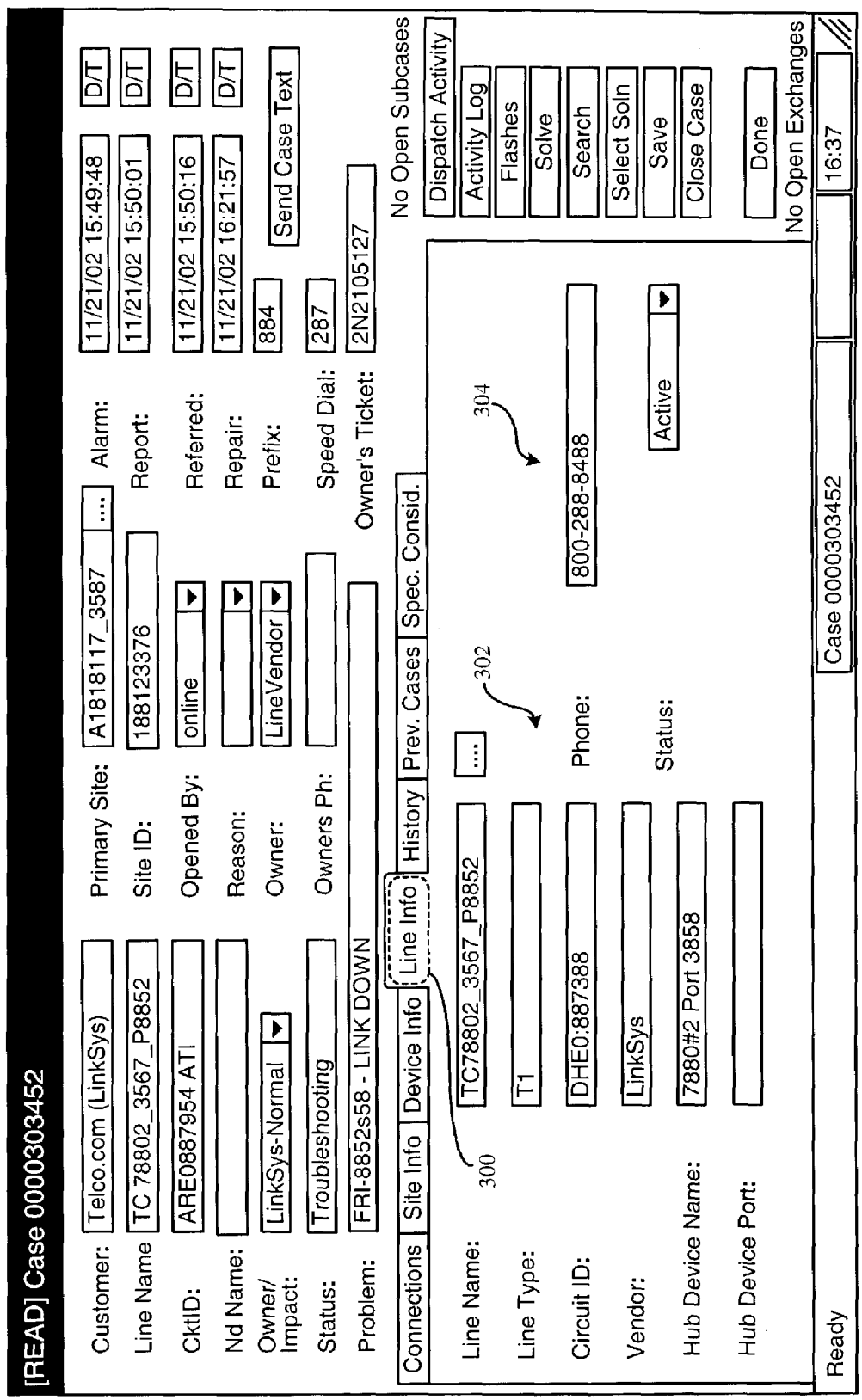

With primary reference now to FIG. 13d, in this page of the GUI, the "Line Info" tab 300 has been selected to thereby display a plurality of predetermined "static" information stored in the ATG database and describing the attributes 302 and 304 of the line with the reported fault condition. This information includes: Line Name (which refers to the name of the line at the host end), Line Type, (which refers to the speed of the line), Circuit ID (which refers to the circuit ID for the host line), Vendor (which refers to the telephone company providing the line), Hub Device Name (which refers to the host device name), Hub Device Port (which refers to the host device port), Vendor Telephone Number (which ensure that the operator can access the device of interest and refers to the vendor's phone number), Status (which indicates whether the line is active or not), etc.

With primary reference now to FIG. 13e, in this page of the GUI, the "History" tab 310 has been selected to thereby display information related to the reported fault condition and describing the attributes 312 and 314 of this fault condition. This information includes: Priority (which refers to the priority of the ticket including contract support priority), Queue (which permits various operators of a central NOC to to view various trouble-tickets and possibly take ownership of such tickets), Owner (which refers to the operator who is responsible for and has permission to alter a given ticket), Creation Date (which refers to the date the trouble-ticket was created), WIP bin (which refers to the work in progress indicator that resides in operator's work area and prevents other operators from taking ownership of a given ticket), Condition (which indicates whether this ticket open or closed), Case Type (which identifies the type of each ticket—for example: trouble, help, entuity, etc.,), etc. Tab 310 also includes a history field 316 with information that has been automatically logged (by the ATG Server) and manually logged (by an operator). This information is preferably accessible by both the operator and the customer so that both parties can stay abreast of the developments associated with the fault condition and its resolution.

FIGS. 14a and 14b are respective left and right halves of a Database GUI 320 displaying a series of trouble-tickets generated in accordance with the invention and discussed above (as indicated by the use of related reference numerals). The GUI of FIGS. 14a and 14b, however, display the trouble-tickets in response to various database queries (in this case, a query based on the customer name). The final entry has been bolded to indicate that it corresponds to the trouble-ticket shown and described with respect to FIGS. 13a-13e. Newly appearing items 311-314 respectively (1) refers to the last time a trouble-ticket was modified; (2) specifies whether a given ticket is still open (being worked on) or closed (fault condition corrected); (3) indicates the customer's priority as determined by the customer's service contract; and (4) indicates the type of component with the fault condition (e.g., L=line).

While the present invention has been described in connection with what is presently considered to be the most practical and preferred embodiments, it is to be understood that the invention is not limited to the disclosed embodiments, but is intended to encompass the various modifications and equivalent arrangements included within the spirit and scope of the appended claims. With respect to the above description, for example, it is to be realized that the optimum dimensional relationships for the parts of the invention, including variations in size, materials, shape, form, function and manner of operation, assembly and use, are deemed readily apparent to one skilled in the art, and all equivalent relationships to those illustrated in the drawings and described in the specification are intended to be encompassed by the appended claims. Therefore, the foregoing is considered to be an illustrative, not exhaustive, description of the principles of the present invention.

What is claimed is:

1. A method of delivering a bundled error message to a network-management operator, the bundled error message comprising network fault data relating to a fault condition of a network and network-specific profile data corresponding to the network with the fault condition, the method comprising:
    receiving fault data identifying the network with the fault condition;
    delaying retrieval of the profile data for a predetermined time and terminating the method before retrieval of the profile data if related fault data, indicating that the fault condition has ceased, is received before the predetermined time has elapsed to thereby reduce the possibility that false-positive error messages may be generated;
    retrieving predetermined network-specific profile data for the network with the fault condition;
    generating a bundled error message including at least some of the fault and the profile data; and
    displaying the bundled error message to the operator.

2. The method of claim 1 wherein
    the method further comprises waiting for receipt of subsequent related fault data from the network before retrieving network-specific profile data;

responsive to receipt of the related fault data, the method further comprises generating modified fault data comprising the fault data and the related fault data; and wherein generating a bundled error message comprises generating a single error message including at least some of the modified fault data and the profile data.

3. The method of claim 2 wherein the related fault data and the fault data share attributes indicating that the same fault condition originated from plural locations of the network; and generating modified fault data comprises compressing plural instances of fault data into an aggregated origination data string indicating that plural locations of the network that have the same fault condition.

4. The method of claim 1 wherein the predetermined time may be adjusted to thereby adjust the possibility that false-positive error messages may be generated.

5. The method of claim 1 further comprising filtering the fault data before retrieving network-specific profile data to thereby prevent retrieval of the network-specific profile data unless the fault data indicates that a device predetermined to be of interest has a fault condition.

6. The method of claim 1 wherein the network-specific profile data comprises data selected from the group consisting of: internal line names, types and IP addresses; internal site names, types and IP addresses; internal station names, types and IP addresses; and internal device names, types and IP addresses.

7. The method of claim 1 wherein the network-specific profile data comprises data selected from the group consisting of: Connections, Site Info, Device Info, Line Info and History.

8. The method of claim 1 wherein the bundled error message comprises a trouble-ticket having history data relating to a past condition that has occurred at the same location as the current condition and wherein the past and current conditions are inverse conditions.

9. The method of claim 1 further comprising delaying retrieval of the profile data for a predetermined time and terminating the method if related fault data, inverse to the previously received fault data, is received before the predetermined time has elapsed.

10. The method of claim 1 wherein the method further comprises waiting for receipt of subsequent related fault data from the network before retrieving network-specific profile data;

responsive to receipt of the related fault data, the method further comprises generating modified fault data comprising the fault data and the related fault data; and wherein generating a bundled error message comprises generating a single error message including at least some of the modified fault data and the profile data.

11. A method of delivering a bundled error message to a network-management operator at a network operations center, the bundled error message comprising network fault data relating to a fault condition of a remote network comprising a host, a port, a station and a remote device, the error message further comprising network-specific profile data corresponding to the network component with the fault condition, the method comprising:

receiving fault data identifying the network component with the fault condition;

delaying retrieval of the profile data for a predetermined time and terminating the method if related fault data, inverse to the previously received fault data, is received before the predetermined time has elapsed;

retrieving network-specific profile data for the network component with the fault condition;

generating a bundled error message including at least some of the fault and profile data; and displaying the bundled error message to the operator.

12. The method of claim 11 wherein the method further comprises waiting for receipt of subsequent related fault data from the network before retrieving network-specific profile data;

responsive to receipt of the related fault data, the method further comprises generating modified fault data comprising the fault data and the related fault data; and wherein generating a bundled error message comprises generating a single error message including at least some of the modified fault data and the profile data.

13. The method of claim 12 wherein the related fault data and the fault data share attributes indicating that the same fault condition originated from plural locations of the network; and generating modified fault data comprises compressing plural instances of fault data into an aggregated origination data string plural locations of the network that have the same fault condition.

14. The method of claim 11 further comprising delaying retrieval of the profile data for a predetermined time and terminating the method before retrieval of the profile data if related fault data, indicating that the fault condition has ceased, is received before the predetermined time has elapsed to thereby reduce the possibility that false-positive error messages may be generated.

15. The method of claim 14 wherein the predetermined time may be adjusted to thereby adjust the possibility that false-positive error messages may be generated.

16. The method of claim 14 wherein the method further comprises waiting for receipt of subsequent related fault data from the network before retrieving network-specific profile data;

responsive to receipt of the related fault data, the method further comprises generating modified fault data comprising the fault data and the related fault data; and wherein generating a bundled error message comprises generating a single error message including at least some of the modified fault data and the profile data.

17. The method of claim 11 wherein the network-specific profile data comprises data selected from the group consisting of: internal line names, types and IP addresses; internal site names, types and IP addresses; internal station names, types and IP addresses; and internal device names, types and IP addresses.

18. The method of claim 11 wherein the network-specific profile data comprises data selected from the group consisting of: Connections, Site Info, Device Info, Line Info and History.

19. A method of delivering an error message to a network-management operator, the message including fault data relating to fault conditions of a network and network-specific profile data corresponding to the network with the fault condition, the method comprising:

receiving fault data identifying fault conditions originating from locations within the network;

waiting a predetermined period of time; terminating the method during the predetermined time period if related fault data, indicating that the fault condition has ceased, is received during the predetermined time;

responsive to passage of the predetermined time period, comparing the received fault data to the network-specific profile data and, if corresponding profile data is retrieved, generating a bundled error message for display to the operator including at least some of the received fault data and at least some of the retrieved profile data, and if corresponding profile data is not retrieved, generating a generic error message for display to the operator including at least some of the received fault data and indicating that a failure to retrieve corresponding profile data has occurred; and responsive to a request to display the generated message, displaying the generated message to the operator.

20. The method of claim 19 further comprising setting an impairment level of the fault condition and including the impairment level in the generated error message, the impairment level being indicative of the severity of the fault condition.

21. The method of claim 19 wherein related fault data is received during the predetermined period, the related fault data and the prior fault data sharing attributes indicating that the same fault condition originated from plural locations of the network; and the method further comprises generating modified fault data comprises compressing plural instances of fault data into an aggregated origination data string plural locations of the network that have the same fault condition.

22. The method of claim 19 wherein the predetermined time may be adjusted to thereby adjust the possibility that false-positive error messages may be generated.

23. The method of claim 19 further comprising filtering the fault data before retrieving network-specific profile data to thereby prevent retrieval of the network-specific profile data unless the fault data indicates that a device predetermined to be of interest has a fault condition.

24. The method of claim 19 wherein the network-specific profile data comprises data selected from the group consisting of: internal line IP addresses; internal site IP addresses; internal station IP addresses; and internal device IP addresses.

25. The method of claim 19 wherein the network-specific profile data comprises data selected from the group consisting of: Connections, Site Info, Device Info, Line Info and History.

26. The method of claim 19 wherein the bundled error message comprises a trouble-ticket having history data relating to past fault conditions that have occurred at the same location as the current fault condition.

27. A computer readable medium containing a computer program for delivering a bundled error message to a network-management operator, the bundled error message comprising network fault data relating to a fault condition of a network and predetermined network-specific profile data corresponding to the network with the fault condition, the computer program comprising:

a module for receiving fault data identifying the network with the fault condition;

a module for delaying retrieval of the profile data for a predetermined time and terminating the method if related fault data, inverse to the previously received fault data, is received before the predetermined time has elapsed;

a module for retrieving network-specific profile data for the network with the fault condition;

a module for generating a bundled error message including at least some of the fault and profile data; and a module for displaying the bundled error message to the operator.

28. The computer readable medium of claim 27 further comprising modules for delaying retrieval of the profile data for a predetermined time and for terminating the method if related fault data, inverse to the previously received fault data, is received before the predetermined time has elapsed.

29. The computer readable medium of claim 27 wherein the computer program further comprises:

a module, responsive to receipt of the fault data, for generating an acknowledgement having an error message identifier and indicating that the fault condition has been detected; and a module for automatically transmitting the acknowledgement to the operator.

30. The computer readable medium of claim 27 wherein the module for retrieving waits for receipt of related fault data from the network before retrieving network-specific profile data; and the computer program further comprises a module, responsive to receipt of related fault data, for generating modified fault data comprises compressing plural instances of fault data into an aggregated origination data string plural locations of the network that have the same fault condition.

31. The computer readable medium of claim 27 wherein the computer program further comprises a module for delaying retrieval of the profile data for a predetermined time and terminating the method before retrieval of the profile data if related fault data, indicating that the fault condition has ceased, is received before the predetermined time has elapsed to thereby reduce the possibility that false-positive error messages may be generated.

32. The computer readable medium of claim 27 wherein the related fault data and the fault data indicate that the same fault condition exists at plural locations of the network; and the module for generating modified fault data indicating that the same fault condition exists at plural locations of the network.

33. The computer readable medium of claim 27 wherein the network-specific profile data comprises data selected from the group consisting of: Connections, Site Info, Device Info, Line Info and History.

34. A system for managing plural potentially faulty networks capable of transmitting to the system fault signals having origination data and being indicative of changes in fault conditions occurring at particular locations on the networks, the system being communicatively linked to the plural networks and comprising:

a database with network-specific profile data for each network communicatively linked to the system, each network-specific profile corresponding to at least one host and at least one a port of a network;

at least one client computer communicatively linked to at least one of the networks for receiving fault signals therefrom, each client creating requests to generate new and/or updated trouble-tickets wherein each request includes origination data of the fault signals, wherein the client creates requests in response to receipt of fault signals, the client send requests to the server only if, after a predetermined period of time, the client has not received respective inverse fault signals and wherein the client computer has an operator interface for presenting information to an operator; and a server communicatively linked to the database and linked to the client for exchanging information therebetween, wherein the server generates trouble-tickets and responds in response to receipt of client requests wherein the trouble-tickets comprise both network-specific profile data and origination data.

35. The system of claim 34 wherein the database further comprises generic profile data;
the server attempts to use the origination data to retrieve the network-specific profile data from the database; and
wherein the server generates generic trouble-tickets if the server cannot retrieve the network-specific profile data from the database.

36. The system of claim 34 wherein
responsive to receipt of a request having origination data for a first location, the server determines whether a prior trouble-ticket has previously been generated with respect to the first location; and
responsive to a determination that the prior trouble-ticket has been generated, logging the new origination data into the prior trouble-ticket.

* * * * *